(12) United States Patent
Duignan et al.

(10) Patent No.: US 12,465,364 B2
(45) Date of Patent: Nov. 11, 2025

(54) DEVICES, SYSTEMS, AND METHODS FOR PYLORIC OCCLUSION

(71) Applicant: Boston Scientific Scimed, Inc., Maple Grove, MN (US)

(72) Inventors: Gerard Duignan, Galway (IE); Darren G. Curran, Galway (IE); James Quinn, Galway (IE); Ryan D. Lynch, Roscommon (IE)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 1104 days.

(21) Appl. No.: 17/405,751

(22) Filed: Aug. 18, 2021

(65) Prior Publication Data

US 2022/0061853 A1 Mar. 3, 2022

Related U.S. Application Data

(60) Provisional application No. 63/071,125, filed on Aug. 27, 2020.

(51) Int. Cl.
*A61B 17/12* (2006.01)

(52) U.S. Cl.
CPC .... *A61B 17/12118* (2013.01); *A61B 17/1204* (2013.01); *A61B 17/12145* (2013.01); *A61B 17/1215* (2013.01); *A61B 2017/1205* (2013.01)

(58) Field of Classification Search
CPC .......... A61B 17/12118; A61B 17/1204; A61B 17/12145; A61B 17/1215;
(Continued)

(56) References Cited

U.S. PATENT DOCUMENTS 5,853,422 A * 12/1998 Huebsch ............ A61B 17/0057
606/213
6,238,335 B1 5/2001 Silverman et al.
(Continued)

FOREIGN PATENT DOCUMENTS

AU 5698701 A 11/2011
EP 2547286 A1 1/2013
(Continued)

OTHER PUBLICATIONS

"Watchman-Left Atrial Appendage Closure Implant," Brochure, Boston Scientific, 10 pages, 2017.
(Continued)

*Primary Examiner* — Tuan V Nguyen
(74) *Attorney, Agent, or Firm* — Seager, Tufte & Wickhem, LLP

(57) ABSTRACT

An occlusion device or plug having a proximal plug section and a distal plug section. The plug sections may each be shifted between an unexpanded configuration and an expanded configuration at the deployment site to occlude the deployment site. A tubular member such as a silicone tube may be used to form an occlusion device or plug shiftable or expandable into a desired configuration. An intermediate section between a proximal plug section and a distal plug section may be configured to be manipulated at least to shift at least one of the plug sections from an expanded configuration to an unexpanded configuration. A pair of stents may be coupled together via an intermediate section in such manner such that manipulation of the intermediate section causes at least one of the stents to shift from an expanded configuration to an unexpanded configuration.

20 Claims, 8 Drawing Sheets

(58) Field of Classification Search
CPC .. A61B 2017/1205; A61B 2017/00588; A61B 2017/00592; A61B 2017/00606; A61B 2017/00619; A61B 2017/00623; A61B 2017/00986; A61B 2017/12095; A61B 17/12136; A61B 17/12172; A61B 2017/00575; A61B 2017/00597; A61B 2017/00601; A61B 17/0057; A61F 5/0079; A61F 5/0087

See application file for complete search history.

(56) References Cited

U.S. PATENT DOCUMENTS

| | | | |
|---|---|---|---|
| 6,251,063 B1 | 6/2001 | Silverman et al. |
| 6,740,121 B2 | 5/2004 | Geitz |
| 6,994,095 B2 | 2/2006 | Burnett |
| 7,128,073 B1 | 10/2006 | van Der Burg et al. |
| 7,175,669 B2 | 2/2007 | Geitz |
| 7,316,716 B2 | 1/2008 | Egan |
| 7,335,493 B2 | 2/2008 | Doucette-Stamm et al. |
| 8,048,169 B2 | 11/2011 | Burnett et al. |
| 8,052,715 B2 | 11/2011 | Quinn et al. |
| 8,114,045 B2 | 2/2012 | Surti |
| 8,211,186 B2 | 7/2012 | Belhe et al. |
| 8,591,598 B2 | 11/2013 | Silverman et al. |
| 8,652,083 B2 | 2/2014 | Weitzner et al. |
| 8,840,679 B2 | 9/2014 | Durgin |
| 9,125,660 B2 | 9/2015 | Fabian et al. |
| 9,173,760 B2 | 11/2015 | Belhe et al. |
| 9,504,591 B2 | 11/2016 | Burnett et al. |
| 9,517,122 B2 | 12/2016 | Firstenberg et al. |
| 9,668,901 B2 | 6/2017 | Dominguez et al. |
| 9,700,323 B2 | 7/2017 | Clark |
| 9,700,449 B1 | 7/2017 | Annunziata et al. |
| 9,730,822 B2 | 8/2017 | O'Neill et al. |
| 9,744,062 B2 | 8/2017 | O'Neill et al. |
| 9,867,334 B2 | 1/2018 | Jongmans et al. |
| 9,889,032 B2 | 2/2018 | Arita et al. |
| 9,913,652 B2 | 3/2018 | Bridgeman et al. |
| 9,913,744 B2 | 3/2018 | O'Neill et al. |
| 9,943,299 B2 * | 4/2018 | Khairkhahan ........ A61M 25/10 |
| 10,052,220 B2 | 8/2018 | Ryan et al. |
| 10,070,981 B2 | 9/2018 | Needleman et al. |
| 10,080,677 B2 | 9/2018 | Stack et al. |
| 10,238,518 B2 | 3/2019 | Annunziata |
| 10,537,453 B2 | 1/2020 | Brister et al. |
| 10,548,753 B2 | 2/2020 | Rousseau |
| 2005/0273135 A1 * | 12/2005 | Chanduszko ...... A61B 17/0057 606/213 |
| 2007/0156248 A1 | 7/2007 | Marco et al. |
| 2008/0140099 A1 | 6/2008 | Ghabrial et al. |
| 2011/0066175 A1 | 3/2011 | Gross |
| 2013/0030351 A1 | 1/2013 | Metamodix |
| 2014/0309682 A1 | 10/2014 | Fabian et al. |
| 2014/0350523 A1 | 11/2014 | Dehdashtian et al. |
| 2015/0075536 A1 | 3/2015 | Brenzel et al. |
| 2015/0313741 A1 | 11/2015 | O'Neill et al. |
| 2015/0313742 A1 * | 11/2015 | O'Neill ................ A61F 5/0036 604/9 |
| 2016/0228276 A1 | 8/2016 | Thompson et al. |
| 2017/0304101 A1 | 10/2017 | O'Neill et al. |
| 2017/0312112 A1 | 11/2017 | Gbel |
| 2017/0333241 A1 | 11/2017 | O'Neill et al. |
| 2019/0298401 A1 | 10/2019 | Gupta et al. |
| 2019/0298559 A1 | 10/2019 | Gupta et al. |

FOREIGN PATENT DOCUMENTS

| | | |
|---|---|---|
| EP | 2928420 A1 | 10/2015 |
| ES | 2662346 T3 | 4/2018 |
| WO | 2008109527 A1 | 9/2008 |
| WO | 2012054414 A2 | 4/2012 |
| WO | 2018038669 A1 | 3/2018 |

OTHER PUBLICATIONS

International Search Report and Written Opinion for the International Application No. PCT/US2021/046518, dated Dec. 2, 2021, 16 pages.

* cited by examiner

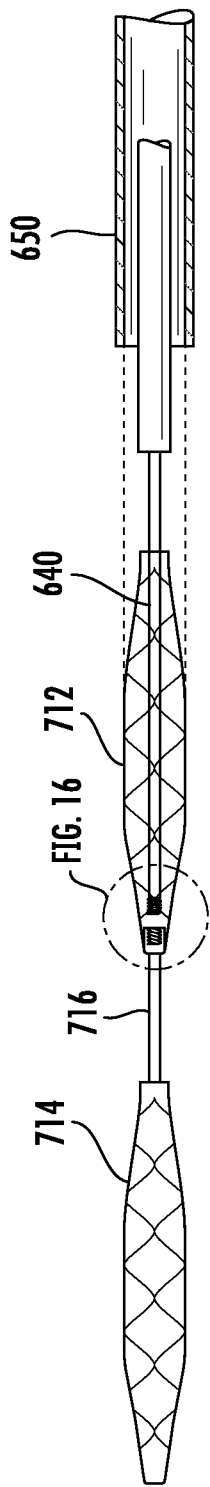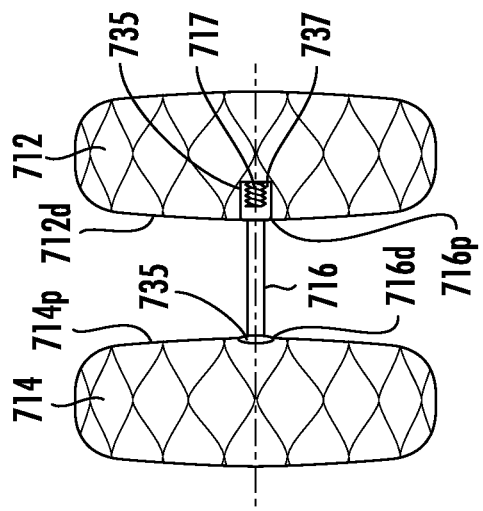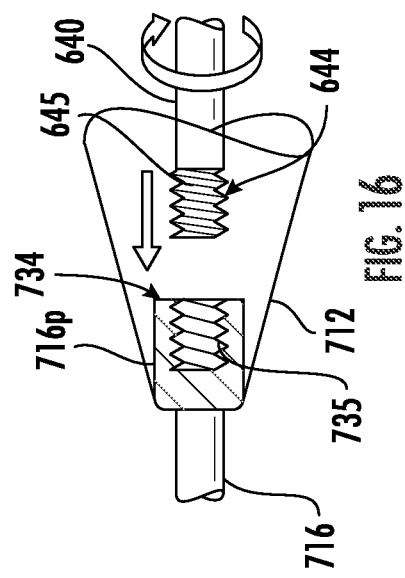

DEVICES, SYSTEMS, AND METHODS FOR PYLORIC OCCLUSION

PRIORITY

The present application is a non-provisional of, and claims the benefit of priority under 35 U.S.C. § 119 to, U.S. Provisional Application Ser. No. 63/071,125, filed Aug. 27, 2020, the disclosure of which is hereby incorporated herein by reference in its entirety.

FIELD

The present disclosure relates generally to the field of devices, systems, and methods for occluding a body lumen. More particularly, the present disclosure relates to devices, systems, and methods for occluding a body lumen in the gastrointestinal tract, such as the pylorus.

BACKGROUND

It may be desirable for a body lumen to be occluded or blocked or plugged for any of a variety of reasons. For instance, it may be desirable to prevent passage of materials through the lumen and divert the materials to pass through another lumen or passage, such as via a bypass or anastomosis.

One type of gastric bypass operation is known technically as a Roux-En-Y gastric bypass in which a small gastric pouch and an alimentary limb (Roux limb) are created and anastomosed to one another and to the jejunum, bypassing part of the small intestine (and absorption therein), and leaving a very small stomach-like pouch, resulting in a patient feel full after ingesting a small amount of food.

If a bypass is created, then the pylorus must be blocked so that food does not enter the duodenum, and, instead, passes through the bypass and into the jejunum. A plug may be positioned within the pylorus to stop the flow of the stomach contents into the proximal section of the small intestines (e.g., the duodenum and optionally also the initial section of the jejunum).

In some procedures in which a body passage is occluded, it may be desirable to reverse the closure, such as by removal of the plug (e.g., endoscopically) after a predetermined amount of time. For instance, it may be desired to remove a pyloric plug a given amount of time after a gastric bypass procedure has been performed. The anastomosis may also be closed or otherwise reversed so that stomach contents resume flowing in the natural path from the stomach, through the pylorus, and into the small intestines via the duodenum.

A need continues to exist for occlusion devices or plugs which are relatively low cost, minimally invasive, easy to deploy, and atraumatic, and which resist undesired migration, and which may be removed from the deployment site if desired.

SUMMARY

This summary of the disclosure is given to aid understanding, and one of skill in the art will understand that each of the various aspects and features of the disclosure may advantageously be used separately in some instances, or in combination with other aspects and features of the disclosure in other instances. No limitation as to the scope of the claimed subject matter is intended by either the inclusion or non-inclusion of elements, components, or the like in this summary. Accordingly, while the disclosure is presented in terms of aspects or embodiments, it should be appreciated that individual aspects can be claimed separately or in combination with aspects and features of that embodiment or any other embodiment.

The present disclosure describes various embodiments of occlusion devices or plugs and associated systems and methods, placement and deployment of the occlusion devices or plugs at a deployment site, and removal of the occlusion devices or plugs. Various properties of the occlusion devices or plugs, including, without limitation, atraumatic construction, anti-migration features, and bioabsorbability, are also disclosed.

In some embodiments, an occlusion device or plug or closure (used interchangeably herein without intent to limit) is configured to shift between an expanded configuration sized to occlude a body passage or lumen and an unexpanded configuration sized for delivery to or removal from the body passage or lumen. In some embodiments, the occlusion device includes a proximal plug section, a distal plug section, and an intermediate section extending between the proximal plug section and the distal plug section.

In some embodiments, the proximal plug section and the distal plug section present a smooth atraumatic outer surface for engagement with the body passage or lumen.

In some embodiments, the proximal plug section and the distal plug section are formed from or covered or coated with silicone.

In some embodiments, at least one of the proximal plug section, the distal plug section, and the intermediate plug section is selectively movable to shift the occlusion device between the expanded and unexpanded configurations.

In some embodiments, relative movement between the intermediate section and at least one of the proximal plug section and the distal plug section causes the at least one of the proximal plug section and the distal plug section to shift from an expanded configuration into an unexpanded configuration.

In some embodiments, relative movement between the intermediate section and at least one of the proximal plug section and the distal plug section causes the at least one of the proximal plug section and the distal plug section to shift from an expanded configuration into an unexpanded configuration. Optionally, in some further embodiments, the occlusion device is formed from a flexible polymeric tubular member forming the proximal plug section and the distal plug section, and the intermediate section is a center core extending through the proximal section and the distal section, and movement of the center core relative to the tubular member shifts the tubular member between expanded and unexpanded configurations. Optionally, in some further embodiments, a locking ring is mounted on and held in a desired position on the center core adjacent the proximal plug section when the occlusion device is in an expanded configuration; and an advancement mechanism is arranged and positioned with respect to the center core and the locking ring to selectively engage the locking ring with the center core for relative movement therebetween and to selectively hold the locking ring in a desired position on the center core when the occlusion device is in a desired expanded configuration, and to release the locking ring from being held in position on the center core to allow the occlusion device to move towards an unexpanded configuration.

In some embodiments with an advancement mechanism, the advancement mechanism includes a pawl fitting in a groove, with the pawl on one of the center core and the locking ring, and the groove on the other of the center core and locking ring. The occlusion device in some embodiments further comprises a quick release mechanism coupled with the advancement mechanism to release the pawl to allow substantially immediate relative movement between the locking ring and the center core.

In some embodiments with a locking ring, the locking ring is rotatably mounted on the center core to move along the center core towards a distal end of the center core and a distal end of the occlusion device to cause the occlusion device to expand, or towards a proximal end of the center core and a proximal end of the occlusion device to allow the occlusion device to return to an unexpanded configuration. Optionally, the center core has a proximal end configured to mate with a distal end of a deployment device, and rotation of the center core via the deployment device causes axial movement of the locking ring relative to the center core. Optionally, locking ring is shaped for engagement with a delivery device, the delivery device being held against rotation to hold the locking ring against rotation.

In some embodiments, the occlusion device is formed of a tubular member, a locking ring is mounted on the intermediate section of the occlusion device for movement relative thereto, and movement of the locking ring along the intermediate section toward the distal plug section causes a proximal end and a distal end of the tubular member to be moved together to cause the tubular member to expand outwardly at the proximal plug section and the distal plug section to form expanded proximal and distal plug sections of an expanded occlusion device. In some aspects, the tubular member forming the occlusion device is formed from silicone or rubber.

In some embodiments, the occlusion device is formed with antimigration features on an outer surface thereof for atraumatic engagement with the body passage or lumen to hold the tubular member in a desired deployment position in the deployment site. In aspects, the occlusion device is formed of a tubular member.

In some embodiments, the proximal plug section and the distal plug section are expandable stents facing each other and coupled together by the intermediate section. In some further embodiments, the proximal plug section and the distal plug section each have a closed end and an open end, wherein pulling the closed end and the open end of a plug section away from each other causes the plug section to shift from an expanded configuration to an unexpanded configuration. In some embodiments, closed ends of the proximal plug section and the distal plug section are positioned with respect to each other, and the intermediate section is coupled with a closed end of at least one of the proximal plug section and the distal plug section such that proximal pulling on the intermediate section causes at least one of the proximal plug section and the distal plug section to shift from an expanded configuration to an unexpanded configuration.

In some embodiments in which the proximal plug section and the distal plug section are expandable stents, the proximal plug section has a closed end positioned at a distal end of the occlusion device, the distal plug section has a closed end positioned at a proximal end of the occlusion device, the intermediate section is coupled to the closed end of each of the proximal plug section and the distal plug section, a proximal end of the intermediate section is engaged by a deployment device by passing the deployment device through the interior of the proximal plug section to mate with the intermediate section at the distal end of the proximal plug section, and pulling of the intermediate section proximally causes the distal plug section to return to an unexpanded configuration. Optionally, a retrieval structure is provided on the open end of the proximal plug section adjacent the proximal end of the occlusion device, and proximal pulling on the retrieval structure causes the proximal plug section to return to an unexpanded configuration.

In some embodiments in which the proximal plug section and the distal plug section are expandable stents, the proximal plug section has a closed end positioned at a proximal end of the occlusion device, the distal plug section has a closed end positioned at a distal end of the occlusion device, the intermediate section is coupled to the closed end of each of the proximal plug section and the distal plug section, a proximal end of the intermediate section is engaged by a deployment device at the proximal end of the occlusion device, and pulling of the intermediate section proximally causes the proximal plug section to return to an unexpanded configuration. Optionally, a retrieval structure is provided on the open end of the distal plug section and extends to adjacent the proximal end of the occlusion device, and proximal pulling on the retrieval structure causes the distal plug section to return to an unexpanded configuration.

In some embodiments in which the proximal plug section and the distal plug section are expandable stents, the intermediate section has a mating section at a proximal end thereof configured for engagement with a distal mating section of a deployment device, and proximal movement of the deployment device when engaged with the intermediate section pulls on an end of at least one of the proximal plug section and the distal plug section to move the occlusion device to an unexpanded configuration from an expanded configuration.

In some embodiments in which the proximal plug section and the distal plug section are expandable stents, the stent sections are separate and independent from each other.

In some embodiments, the occlusion device is formed from a tubular member forming both the proximal plug section and the distal plug section to enclose a common interior. In some aspects, the tubular member is flexible silicone tubular member substantially impervious to passage of matter therethrough. In some further aspects, the intermediate section is a center core passing through the tubular member from a proximal end of the occlusion device to a distal end of the occlusion device. In other further aspects, the tubular member is preformed to expand into a predetermined expanded shape selected based on the deployment site.

In accordance with other aspects, a system for occluding a body passage or lumen is disclosed.

In some embodiments, the occlusion system includes an occlusion device having proximal plug section, a distal plug section, and an intermediate section extending between the proximal plug section and the distal plug section. The occlusion system includes a deployment device mating with the intermediate section of the occlusion device, and which is engageable with the intermediate section to move the intermediate section to cause at least one of the proximal plug section and the distal plug section to shift from an expanded configuration to an unexpanded configuration.

In some embodiments of an occlusion system, the occlusion device is formed from a flexible polymeric tubular member forming the proximal plug section and the distal plug section. In some aspects, the intermediate section is a center core extending through the proximal section and the distal section, the center core having a proximal end configured to mate with a distal end of the deployment device, and wherein movement of the deployment device causes relative movement of the center core to cause at least one of the proximal plug section and the distal plug section to shift between an expanded configuration and an unexpanded configuration. In some further aspects, the occlusion device further includes a locking ring, and a delivery device, wherein the delivery device has a distal end configured to abut a proximal side of the locking ring to control movement of the locking ring relative to the center core.

In some embodiments of an occlusion system, the proximal plug section and the distal plug section present a smooth atraumatic outer surface for engagement with the body passage or lumen, and at least one of the proximal plug section, the distal plug section, and the intermediate section is selectively movable to shift the occlusion device between the expanded and unexpanded configurations.

In some embodiments of an occlusion system, the occlusion device further comprises a locking ring mounted on and held in a desired position on the intermediate section adjacent the proximal plug section when the occlusion device is in an expanded configuration.

In other embodiments of an occlusion system, the proximal plug section and the distal plug section are expandable stents facing each other and coupled together by the intermediate section, the proximal plug section and the distal plug section each having a closed end and an open end, wherein pulling the closed end and the open end of a plug section away from each other causes the plug section to shift from an expanded configuration to an unexpanded configuration. In some aspects, the intermediate section has a mating section at a proximal end thereof configured for engagement with a distal mating section of the deployment device, and proximal movement of the deployment device when engaged with the intermediate section pulls on a closed end of at least one of the proximal plug section and the distal plug section to shift said at least one of the proximal plug section and the distal plug section from an expanded configuration to an unexpanded configuration. In some aspects, the stents are separate and independent stents.

In accordance with other aspects, a method for occluding a body passage or lumen is disclosed.

In some aspects, a method for occluding a body passage or lumen includes positioning at a deployment site an occlusion device comprising a proximal plug section and a distal plug section with an intermediate section extending therebetween, expanding the occlusion device in a deployment site, and manipulating the intermediate section to cause at least one of the proximal plug section and a distal plug section to shift from an expanded configuration to an unexpanded configuration.

In some embodiments of such method, a tubular member forms the proximal plug section and the distal plug section, the intermediate section is a center core extending through the proximal plug section and the distal plug section, and the method further includes moving the center core and the tubular member relative to each other to cause a proximal end and a distal end of the tubular member to move together to expand the occlusion device or to move apart to shift the occlusion device to an unexpanded configuration.

In other embodiments of the method of occluding a body passage or lumen, the proximal plug section and the distal plug section are expandable stents facing each other and coupled together by the intermediate section, the proximal plug section and the distal plug section each have a closed end and an open end, and the intermediate section is coupled with a closed end of at least one of the proximal plug section and the distal plug section. In some aspects, pulling the closed end and the open end of a plug section away from each other causes the plug section to shift from an expanded configuration to an unexpanded configuration, and the method further comprises pulling proximally on the intermediate section to cause the at least one of the proximal plug section and the distal plug section to shift from an expanded configuration to an unexpanded configuration.

The above aspects and other features and advantages of the present disclosure will be readily apparent from the following detailed description, the scope of the claimed invention being set out in the appended claims.

BRIEF DESCRIPTION OF THE DRAWINGS

Non-limiting embodiments of the present disclosure are described by way of example with reference to the accompanying drawings, which are schematic and not intended to be drawn to scale. The accompanying drawings are provided for purposes of illustration only, and the dimensions, positions, order, and relative sizes reflected in the figures in the drawings may vary. For example, devices may be enlarged so that detail is discernable, but is intended to be scaled down in relation to, e.g., fit within a working channel of a delivery catheter or endoscope. In the figures, identical or nearly identical or equivalent elements are typically represented by the same or similar reference characters. For purposes of clarity and simplicity, not every element is labeled in every figure, nor is every element of each embodiment shown where illustration is not necessary to allow those of ordinary skill in the art to understand the disclosure.

The detailed description will be better understood in conjunction with the accompanying drawings, wherein like reference characters represent like elements, as follows:

FIG. 15 illustrates the lumen occlusion device or plug of FIG. 14 in an unexpanded configuration, in cross-section, and an embodiment of a delivery system for inserting the plug into a body lumen.

FIG. 16 illustrates an isolated view, in cross-section, of an installation connection which may be used with the lumen occlusion device or plug and delivery system of FIGS. 14 and 15.

FIG. 17 illustrates a more detailed view of the lumen occlusion device or plug of FIG. 16 in an expanded configuration.

DETAILED DESCRIPTION

Figure 1:
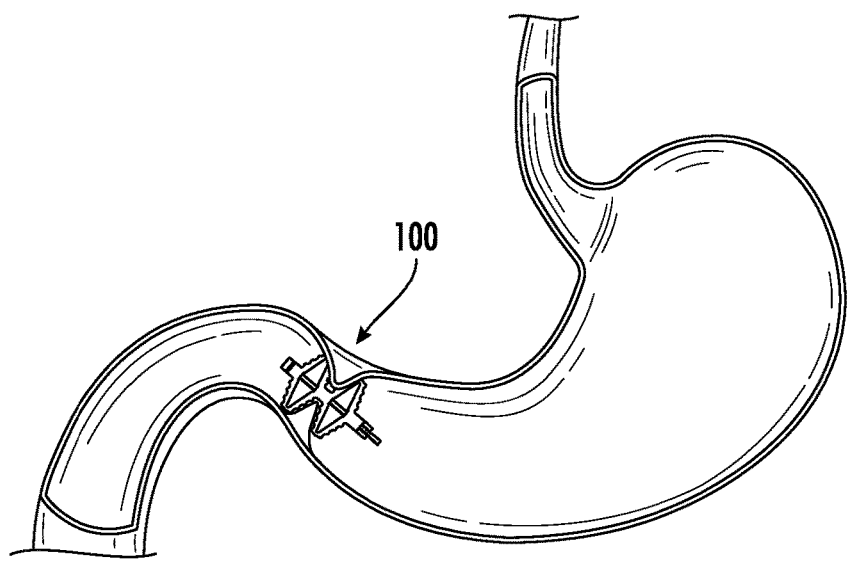
FIG. 1 illustrates an embodiment of a lumen occlusion device or plug in accordance with the present disclosure positioned in a pylorus.

The following detailed description should be read with reference to the drawings, which depict illustrative embodiments. It will be appreciated that the present disclosure is set forth in various levels of detail in this application. In certain instances, details that are not necessary for one of ordinary skill in the art to understand the disclosure, or that render other details difficult to perceive may have been omitted. All of the devices and/or methods disclosed and claimed herein can be made and executed without undue experimentation in light of the present disclosure. It should be understood that the claimed subject matter is not necessarily limited to the particular embodiments or arrangements described or illustrated herein, the scope of the claimed invention being set out in the appended claims.

As used herein, "proximal" refers to the direction or location closest to the user (medical professional or clinician or technician or operator or physician, etc., such terms being used interchangeably without intent to limit or otherwise), etc., such as when using a device (e.g., introducing the device into a patient, or during implantation, positioning, or delivery), and "distal" refers to the direction or location furthest from the user, such as when using a device (e.g., introducing the device into a patient, or during implantation, positioning, or delivery). "Central" means at least generally bisecting a center point.

As used herein, the singular forms "a", "an", and "the" include plural referents unless the content clearly dictates otherwise. As used in this specification and the appended claims, the term "or" is generally employed in its sense including "and/or" unless the content clearly dictates otherwise.

Various embodiments of a lumen closure or occlusion device or plug, such as a lumen apposing closure or occlusion device or plug (used interchangeably herein without intent to limit, generally referring to a "plug" for the sake of convenience without intent to limit) shaped and configured to plug or obstruct or occlude or otherwise a body lumen will now be described. Although the embodiments of devices, systems, and methods disclosed herein are described and illustrated in connection with the gastric environment, it will be appreciated that uses in connection with other environments are within the scope and spirit of the present disclosure. As such, it will be appreciated that embodiments of devices, systems, and methods in accordance with the present disclosure may be advantageous for use in any other procedures and/or anatomy, for deployment of an occlusion device to prevent movement of material or otherwise through a body passage.

It will be appreciated that reference in this specification to "one embodiment," "an embodiment," "some embodiments", "other embodiments", etc. indicates that one or more particular features, structures, and/or characteristics in accordance with principles of the present disclosure may be included in connection with the embodiment. However, such references do not necessarily mean that all embodiments include the particular features, structures, and/or characteristics, or that an embodiment includes all features, structures, and/or characteristics. Some embodiments may include one or more such features, structures, and/or characteristics, in various combinations thereof. Moreover, references to "one embodiment," "an embodiment," "some embodiments", "other embodiments", etc. in various places in the specification are not necessarily all referring to the same embodiment, nor are separate or alternative embodiments necessarily mutually exclusive of other embodiments. When particular features, structures, and/or characteristics are described in connection with one embodiment, it should be understood that such features, structures, and/or characteristics may also be used in connection with other embodiments whether or not explicitly described, unless clearly stated to the contrary. Moreover, various features are described which may be exhibited by some embodiments and not by others. Similarly, various features or requirements are described which may be features or requirements for some embodiments but may not be features or requirements for other embodiments The present disclosure relates to devices, systems, and methods which may be used to occlude a body passage or lumen, such as during an endoscopic, laparoscopic, and/or open surgical procedure (e.g., in connection with creation of a gastrojejunal anastomosis). One example of such use is in connection with occluding a pylorus, as described in United States Patent Application Publications US2019/0298401 and US2019/0298559, which applications are herein incorporated by reference in their entireties. For example, in some embodiments, a plug formed in accordance with the present disclosure may be used in endoscopic procedures in which occlusion of the pylorus and duodenal access is indicated. For example, one manner of combatting obesity or diabetes is by reducing or even preventing the passage of chyme or other gastric matter (solid or liquid) or other nutrients from the stomach to the duodenum. For such approach, duodenal access is occluded, and stomach content is redirected through an alternative path, effectively bypassing the duodenum (and pancreas) or at least delaying interaction of the stomach content with digestive enzymes until further down the small intestine. To create the bypass, a natural orifice transluminal endoscopic surgery (NOTES) procedure may be advantageous over other types of bypass procedures from a stomach to a jejunum (e.g., an endoscopic ultrasound procedure) so that a jejunal loop, or a loop of small bowel in the jejunum, may be selected a distance from the pylorus.

In some embodiments, an anastomosis may be created into the jejunum in a region that may not otherwise be reachable using other systems. In this manner, absorption of stomach content by the small intestine is interrupted, thereby promoting patient weight loss and reducing obesity, as well as potentially controlling type-2 diabetes as well.

In some procedures in which a body passage is occluded, such as occlusion of a pylorus in conjunction with a gastric bypass procedure, it may be desirable to reverse the closure, such as by removal of the plug (e.g., endoscopically) after a predetermined amount of time. The anastomosis may also be closed or otherwise reversed so that stomach contents resume flowing in the natural path from the stomach, through the pylorus, and into the small intestines via the duodenum. Accordingly, the present disclosure describes various embodiments of occlusion devices or plugs which may be deployed (such as by expansion) in a body lumen, such as a pylorus, and also retrieved or otherwise removed from the deployment site. An occlusion system such as disclosed herein includes one or more of: an occlusion device or closure device or plug (as noted above, used alternately herein without intent to limit, and often referenced herein as a plug merely for the sake of simplicity), wherein the plug may in some instances be considered a lumen apposing plug; a delivery device configured to be engaged or coupled with the plug during delivery and to assist with delivery to the deployment site; a deployment device to effectuate deployment of the plug at the deployment site (such as by detachment from the delivery device); a removal device configured to access and to remove the plug from the deployment site; a delivery catheter configured to carry the aforementioned devices or components to and from the deployment site; and controls and handles and other components manipulated by the clinician proximal to the deployment site and typically external to the patient.

Figure 2:
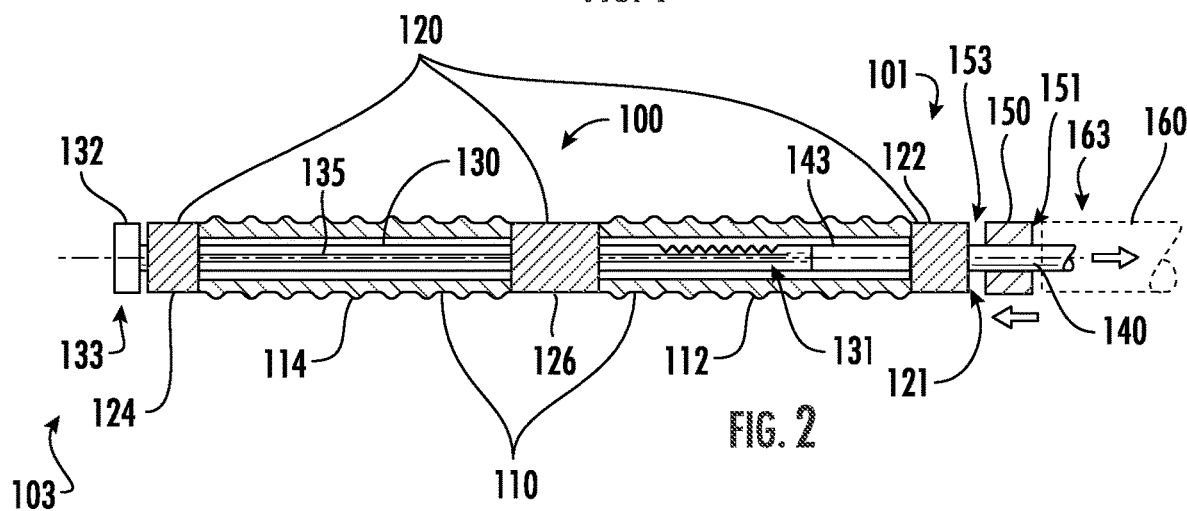
FIG. 2 illustrates the lumen occlusion device or plug of FIG. 1 in an unexpanded configuration for insertion into a body lumen.
Figure 3:
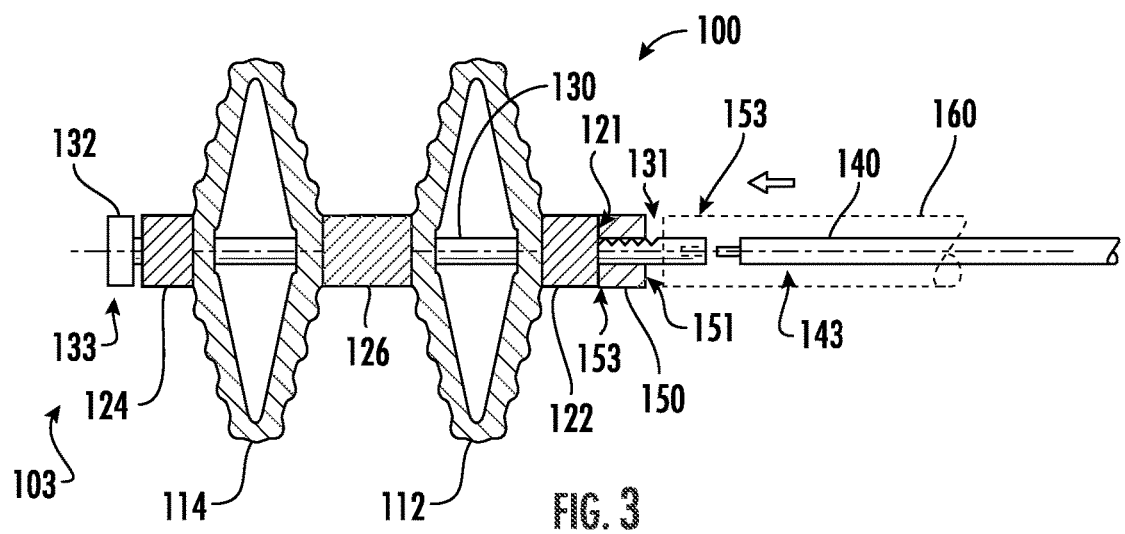
FIG. 3 illustrates the lumen occlusion device or plug of FIG. 2, in cross-section, in an expanded configuration.
Figure 4:
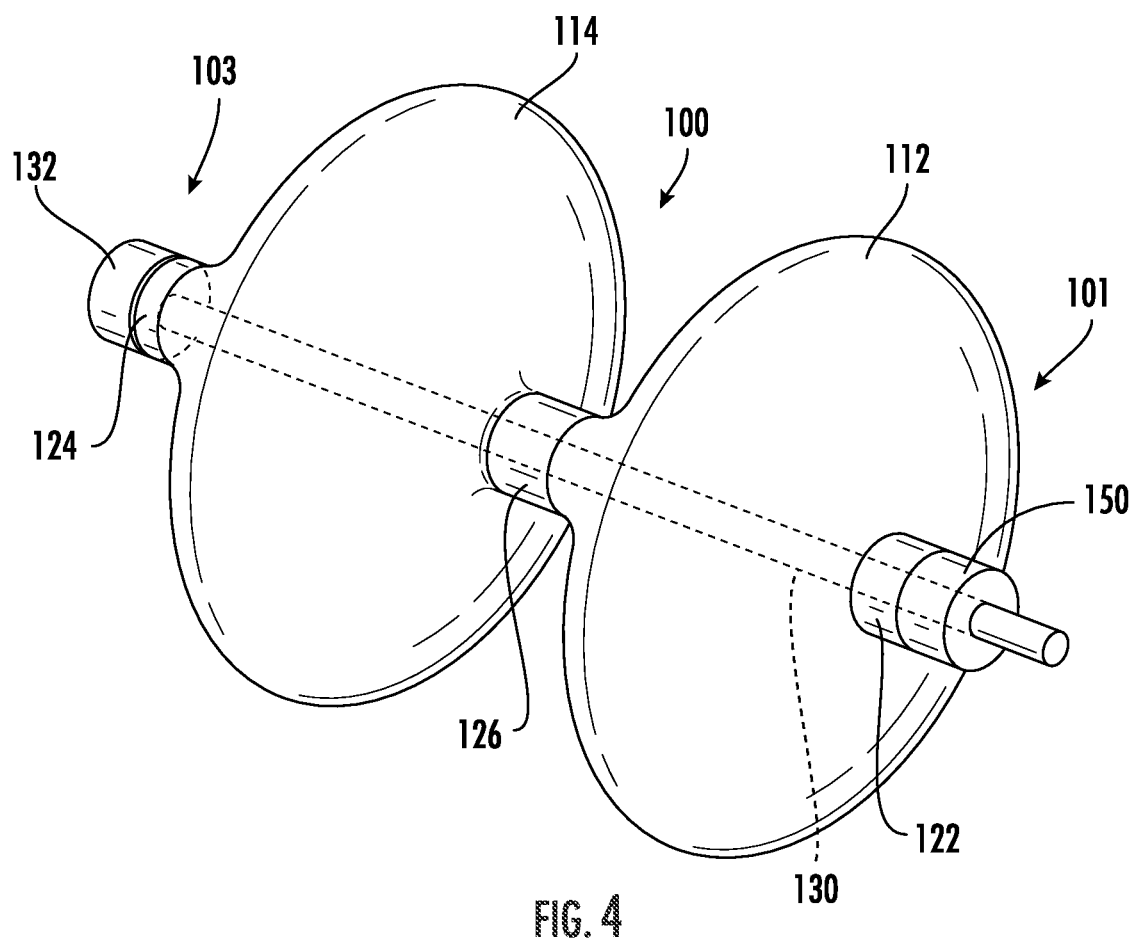
FIG. 4 illustrates a perspective view of the lumen occlusion device or plug of FIG. 3.

Referring now to the drawings, an embodiment of a plug 100 used as a pyloric plug is illustrated in FIG. 1 in place within a pylorus to block passage of the stomach contents to the duodenum. The illustrated embodiment may be selectively movable to shift between an unexpanded configuration, as shown in FIG. 2, for deployment, and an expanded configuration, as shown in FIGS. 3 and 4, for blocking the passage in which the plug 100 is deployed. In accordance with one aspect of the present disclosure, the plug 100 is formed of a flexible tubular member 110 manipulatable to shift between unexpanded and expanded configurations. In some embodiments, the proximal end 101 of the plug 100 and the distal end 103 of the plug 100 are moved closer to each other to cause the plug 100 to shift from its unexpanded to its expanded configuration. Reverse movement of the proximal end 101 and distal end 103 of the plug 100 away from each other returns the plug 100 to its unexpanded configuration, such as for removal from the deployment site.

In some embodiments, the plug 100 is formed of an adaptable, yet resilient material, such as silicone or rubber. The material may be selected to be sufficiently flexible to readily adapt to the anatomy in which the plug 100 is deployed and expanded. For instance, the material may be selected and the plug wall formed such that the expanded plug 100 absorbs movement, at least more so than would be absorbed by a stent or another less adaptable material. Moreover, the plug 100 material may present an atraumatic outer surface (e.g., smooth, other than optional anti-migration features provided to minimize potential migration risks) to contact the body lumen in a manner that may be considered less traumatic than contact by a stiffer material. For use as a plug, the material is solid/relatively impermeable or impervious to passage of matter (e.g., liquids or solids) therethrough so that, when expanded, the plug 100 blocks passage of matter therethrough. In some embodiments, the plug 100 of FIGS. 1-9 may be considered an internally enclosed, fully encapsulated tube so that no material passes through the plug 100.

Further features of the plug 100 illustrated in FIGS. 1-4 will be better understood in connection with a description of manners in which the plug 100 may be deployed and/or removed. Turning to FIG. 2, a plug 100 in an undeployed configuration is illustrated in cross-section. The cross-sectional shape/diameter is generally sized to fit in a suitable delivery catheter 102 (or any other component or device known or heretofore known in the art as usable to deliver another device or component into the body) which may be used to convey the plug 100 and associated devices and components to the delivery site as known in the art. When the delivery catheter 102 reaches the desired deployment site (such as a pylorus as illustrated in FIG. 1), the delivery catheter 102 is withdrawn proximally sufficiently to expose the plug 100 conveyed therein to extend across the desired location to be occluded. The plug 100 includes a flexible tubular member 110 with a plug proximal section 112 and a plug distal section 114 which are selectively movable between an unexpanded configuration, such as illustrated in FIG. 2, and an expanded configuration, such as illustrated in FIG. 3. In some embodiments, the plug proximal section 112 and plug distal section 114 are in fluid communication with a common interior passage therethrough.

In some embodiments, substantially rigid sections 120 are provided along the tubular member 110 such as to define the plug proximal section 112 and the plug distal section 114. In the embodiments illustrated in FIGS. 2 and 3, the substantially rigid sections 120 include a proximal section 122, a distal section 124, and an intermediate section 126, which may be considered to define the plug proximal section 112 and the plug distal section 114 of the tubular member 110. When the plug 100 is deployed in a location that has a necked region, such as a pylorus, the plug intermediate section 126 may be positioned in that necked region as the plug intermediate section 126 generally is not expanded when the plug proximal section 112 and plug distal section 114 of the plug 100 are expanded. The positions of the proximal section 122 and the distal section 124 may be substantially set with respect to the ends of the tubular member 110, and the position of the intermediate section 126 may be capable of being varied along the length of the tubular member 110. It will be appreciated that the relative distances between the proximal section 122 and intermediate section 126 can affect the outer diameter of the plug proximal section 112 when expanded. Similarly, it will be appreciated that the relative distances between the distal section 124 and intermediate section 126 can affect the outer diameter of the plug distal section 114 when expanded. Generally, the larger the distance between adjacent substantially rigid sections 120, the longer the extent of the portion of the tubular member 110 therebetween, and the greater the diameter of the expanded configuration of the plug section defined by that portion of the tubular member 110. In some embodiments, it may be desirable to inhibit movement of the intermediate section 126 once placed in a desired position defining the desired extents of the plug proximal section 112 and the plug distal section 114. A movement inhibiting element, such as an element which increases friction between the intermediate section 126 and the underlying tubular member 110, such as an internal rubber ring, or other internal features (formed integrally or separately) within or on the interior surface of the intermediate section 126, may be provided between the intermediate section 126 and the tubular member 110.

In some embodiments, a center core 130 extends through the interior of the plug 100. Optionally, a small inner lumen 135 may be provided through the center core 130 to accommodate any back pressure and/or equalize pressure differentials. As illustrated in FIGS. 2 and 3, in some embodiments the center core proximal end 131 may be coupled to a deployment device 140 having a proximal end (not shown) extending to a proximal end of the occlusion system for manipulation by the clinician deploying the plug 100, and a distal end 143 engaged with or coupled to the proximal end 131 of the center core 130. In some embodiments, a locking ring 150 is provided in connection with the deployment device 140 and center core 130 (e.g., over a distal region of the deployment device 140 before deployment of the plug 100, as shown in FIG. 2, and over a proximal region of the center core 130 after deployment of the plug 100 and removal of the deployment device 140, as shown in FIG. 3) and is selectively movable distally such as to assist with moving the plug 100 into an expanded, deployed configuration. In other embodiments, a suture or clip could be used instead of a locking ring to maintain the plug 100 in the expanded configuration in manners understood by those of ordinary skill in the art.

Expansion and deployment of the plug 100 may generally be achieved by moving the proximal end 101 and the distal end 103 towards each other to cause the substantially flexible plug proximal section 112 and plug distal section 114 of the plug 100 to expand as will now be described.

In some embodiments, as illustrated in FIGS. 2 and 3, a delivery device 160 (e.g., a catheter, sheath, or other form of delivery device known in the art or heretofore developed) extends over the deployment device 140 and proximally of the plug 100. A proximal end of the delivery device 160 extends to a proximal end of the occlusion system for manipulation by the clinician deploying the plug 100. As may be appreciated upon comparison of FIGS. 2 and 3, a distal end 163 of the delivery device 160 is selectively movable distally to abut a proximal end 151 of the locking ring 150. Once the plug 100 is generally in a desired position at the deployment site, the proximal end 101 and the distal end 103 of the plug 100 are moved together to expand the tubular member 110 from the unexpanded configuration of FIG. 2 to the expanded configuration of FIG. 3 to occlude the deployment site. Relative movement of the proximal end 101 and distal end 103 of the plug 100 towards each other may be achieved by relative movement between the tubular member 110 and the center core 130, such as either by proximally advancing the distal end 103 of the plug towards the proximal end 101 of the plug 100 (while substantially holding in place the proximal end 101 of the plug 100), or by distally advancing the proximal end 101 of the plug 100 towards the distal end 103 of the plug 100 (while substantially holding in place the distal end 103 of the plug 100), or a combination of both movements, or by other relative movement of the proximal end 101 and distal end 103 towards each other.

To expand the plug 100 by moving the distal end 103 towards the proximal end 101, the proximal end 101 may be substantially held in place. For instance, the delivery device 160 may be moved distally to abut and move the locking ring 150 distally until the distal end 153 of the locking ring 150 abuts a proximal end 121 of the proximal section 122 at the proximal end 101 of the plug 100. As the delivery device 160 is held in place, the proximal end 101 of the plug 100 is held in place. The distal end 103 of the plug 100 may then be moved proximally toward the proximal end 101 of the plug 100. In some embodiments, the center core 130 may be pulled proximally to move the distal end 103 of the plug 100 towards the proximal end 101 of the plug 100. For instance, in some embodiments, such as described below, the distal end 133 of the center core 130 engages the distal end 103 of the plug 100 to transfer proximal movement of the center core 130 into proximal movement of the distal end 103 of the plug 100.

In some embodiments, the deployment device 140 may be used to move the center core 130 proximally. For instance, in the embodiment illustrated in FIG. 2, the distal end 143 of deployment device 140 is coupled to the proximal end 131 of the center core 130 (e.g., via threading). Proximal movement of the deployment device 140 thus causes proximal movement of the center core 130.

As illustrated in FIGS. 2 and 3, in some embodiments the center core distal end 133 may extend outside the plug 100. In addition or alternatively, as illustrated in FIGS. 2 and 3, in some embodiments in which the distal end 133 of the center core 130 extends outside the plug 100, the center core distal end 133 includes a center core distal end section 132. In some embodiments, the center core distal end section 132 may be an expanded section or base providing an end abutment useful in deploying the plug 100 into its expanded configuration. The center core distal end section 132 may abut the distal section 124 and move the distal section 124 proximally as the center core 130 is moved proximally (such as by proximally moving the deployment device 140 coupled thereto) to cause at least the plug distal section 114 to expand. Continued proximal movement of the distal end 103 of the plug 100 may simultaneously or sequentially cause the intermediate section 126 to move proximally relative to the proximal section 122 to cause the plug proximal section 112 to expand as well. It will be appreciated that engagement of the center core 130 with the distal end 103 of the plug 100 may be achieved in other manners within the scope and spirit of the present disclosure.

Expansion of the plug 100 by moving the plug proximal end 101 distally towards the plug distal end 103 may be employed in addition or alternatively. In some instances, such as when intermediate section 126 is positioned in a necked region (such as a pylorus), once the plug distal section 114 has expanded, the center core 130 may not readily advance further proximally (because the expanded plug distal section 114 cannot advance further proximally, past the necked deployment site region, and thus cannot proximally advance the center section 126 further proximally). In such instances, once the plug distal section 114 has expanded (such as by moving the plug distal end 103 proximally to the plug proximal end 101), the plug proximal end 101 is moved distally towards the plug distal end 103 to expand the plug proximal section 112. To achieve the desired relative movement, the center core 130 may substantially be held in place. In some embodiments, in which the deployment device 140 is coupled with the center core 130, the deployment device 140 is substantially held in place to hold the center core 130 in place as the proximal end 101 of the plug 100 is advanced distally. In some embodiments, the delivery device 160 is moved distally to move the locking ring 150 distally to move the proximal section 122 distally. As the proximal section 122 is moved distally closer to the intermediate section 126, the plug proximal section 112 expands. Likewise, in cases in which the plug distal section 114 has not yet been expanded, as the intermediate section 126 is moved closer to the distal section 124, the plug distal section 114 expands.

It will be appreciated that the distance between the proximal end 101 and distal end 103 of the plug 100 may be adjusted to affect, alter, adjust, shift etc. the expanded configuration of the plug proximal section 112 and plug distal section 114. For instance, the shape, size, height, expansion, configuration, etc., of the plug proximal section 112 and plug distal section 114 may be varied depending on the relative distance between the proximal end 101 and distal end 103 of the plug 100.

In order to maintain the expanded plug configuration illustrated in FIG. 3, the locking ring 150 may be configured to be held in place relative to the center core 130 to maintain a selected position with respect to the center core 130, such as at the proximal end 101 of the plug 100. Various embodiments are disclosed herein for holding the locking ring 150 in a desired position relative to the plug 100 and/or the center core 130. Such embodiments may be used with any mode of moving the proximal end 101 and distal end 103 of the plug 100 together. In some embodiments, advancement mechanisms are provided engaging the locking ring 150 with the center core 130 for controlled relative movement therebetween to control advancement of the locking ring 150. In addition, various embodiments are disclosed herein for releasing the locking ring 150 should removal of the plug 100 (generally requiring return of the plug 100 to an unexpanded configuration) be desired. It will be appreciated that once the locking ring 150 has been released from a set position maintaining the plug 100 in its expanded configuration, the proximal end 101 and distal end 103 of the plug 100 may be moved apart to return the plug 100 to its unexpanded configuration. It is noted that in some embodiments, such as illustrated for example in FIG. 3, the proximal end 131 of the center core 130 extends outside the plug 100 when the plug 100 is in the expanded, deployed configuration. As such, if it is desired to remove a plug 100 such as shown in FIGS. 3 and 4, the proximal end 131 of the center core 130 is accessible for engaging or coupling with a deployment device 140 to hold the center core 130 and to withdraw the center core 130 proximally for removal (once the plug 100 has been returned to an unexpanded configuration for removal). It will be appreciated that other manners of accessing the plug 100 to return it to an unexpanded configuration for removal are within the scope and spirit of the present disclosure.

Figure 5:
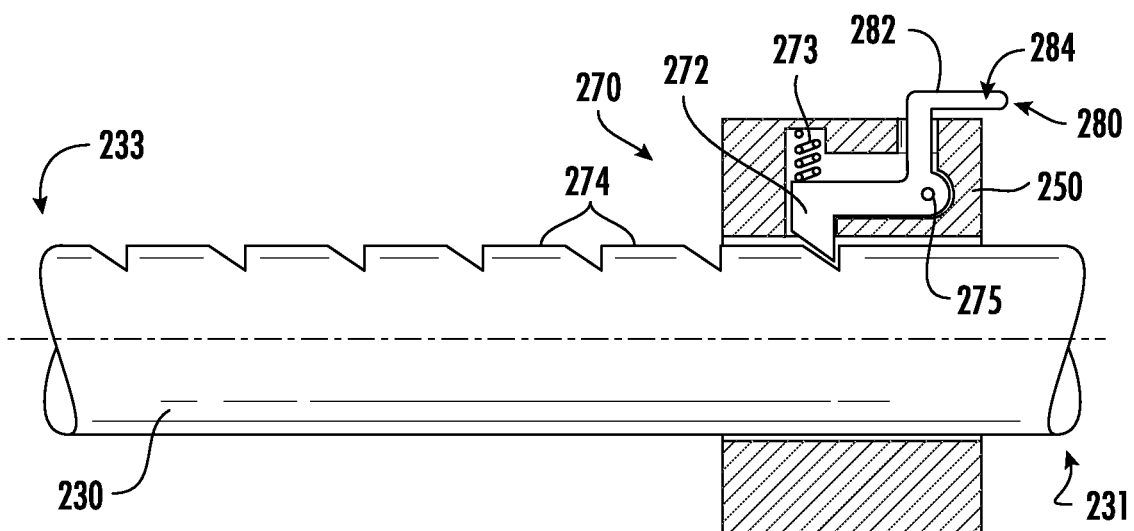
FIG. 5 illustrates an isolated view of an embodiment of a locking ring and quick-release mechanism which may be used with a lumen occlusion device or plug such as illustrated in FIGS. 1-4.

One embodiment of a locking ring 150 which may be used to maintain a plug 100 in a selected position (and to allow return of the plug 100 to an unexpanded configuration), such as described above, is illustrated in FIG. 5. The locking ring 250 shown in FIG. 5 is held in place relative to the center core 230 with a ratcheting advancement mechanism 270 having a pawl 272 held in grooves or gaps between teeth 274 (only some of the teeth are indicated by reference number for the sake of simplicity). In some embodiments, the teeth 274 are formed on an exterior surface of the center core 230, and the locking ring 250 is configured to carry the pawl 272 and a biasing member 273 (such as a spring, illustrated in FIG. 5 as, for example, a coil spring, though other configurations are within the scope of the disclosure) positioned to bias the pawl 272 into engagement with the teeth 274. It will be appreciated that other configurations of ratcheting mechanisms are within the scope and spirit of the present disclosure. As the locking ring 250 advances distally along the center core 230 (e.g., the locking ring 250 moves substantially axially with respect to the center core 230, such as being pushed by the delivery device 160), the pawl 272 rides along the teeth 274 (e.g., pivoting about a pivot 275 and generally against the biasing force of the biasing member 273) on the center core 230. As described above, advancement of the locking ring 250 towards the distal end 103 of a plug 100 (such as in FIGS. 2-4) moves the plug proximal end 101 towards the plug distal end 103 to result in expansion of the plug 100. Once the desired expansion has been achieved, the clinician stops moving the proximal end 101 and distal end 103 of the plug together, and the locking ring 250 of FIG. 5 is held in place by the biasing member 273 biasing the pawl 272 to remain between adjacent teeth 274 on the center core 230. It will further be appreciated that the advancing mechanism 270 allows controlled movement of the locking ring 150 relative to the center core 130 for adjustability of the relative distances between the proximal end 101 and distal end 103 of the plug 100, thereby affecting the shape, size, height, expansion, configuration, etc., of the plug proximal section 112 and the plug distal section 114.

If adjustments are needed during deployment of a plug 100 with a locking ring 250 as shown in FIG. 5, a quick release 280 is provided on the locking ring 250 to allow substantially immediate release of the locking ring 250 and relative movement between the locking ring 250 and the center core 230. In the example of a quick release 280 illustrated in FIG. 5, the quick release 280 is in the form of a leg 282 extending away from the pawl 272 (e.g., in an opposite direction from the pivot 275 than the direction from which the pawl 272 extends) to an engagement end 284. As illustrated in FIG. 5, the engagement end 284 may extend along (e.g., axially) the exterior of the locking ring 250 for engagement by an engagement tool with a proximal end sufficiently sized and configured and stable (e.g., not overly-flexible) to transmit a force to the engagement end 284 to move the pawl 272 out of engagement between the teeth 274. For instance, a grasper may be used to depress the engagement end 284, or a suture may be used to pull down on the engagement end 284. Other modes and configurations of operating the quick release 280 are within the scope and spirit of the present disclosure. The quick release 280 may be actuated during deployment to adjust the expanded configuration of the plug 100 as desired.

If no further adjustments are needed, the deployment device 140 is decoupled from the center core 130, 230 and proximally withdrawn along with the delivery device 160. The pyloric plug 100 may be left at the deployment site in its expanded configuration for as long as indicated by the procedure for which the plug 100 was deployed.

Figure 6:
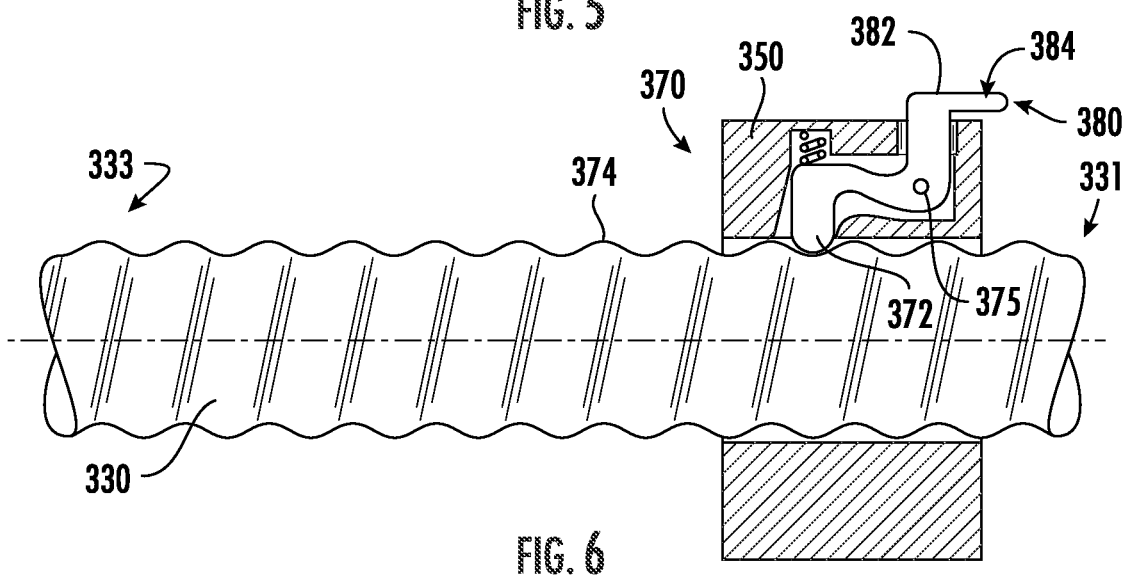
FIG. 6 illustrates an isolated view of another embodiment of a locking ring and quick-release mechanism which may be used with a lumen occlusion device or plug such as illustrated in FIGS. 1-4.
Figure 7:
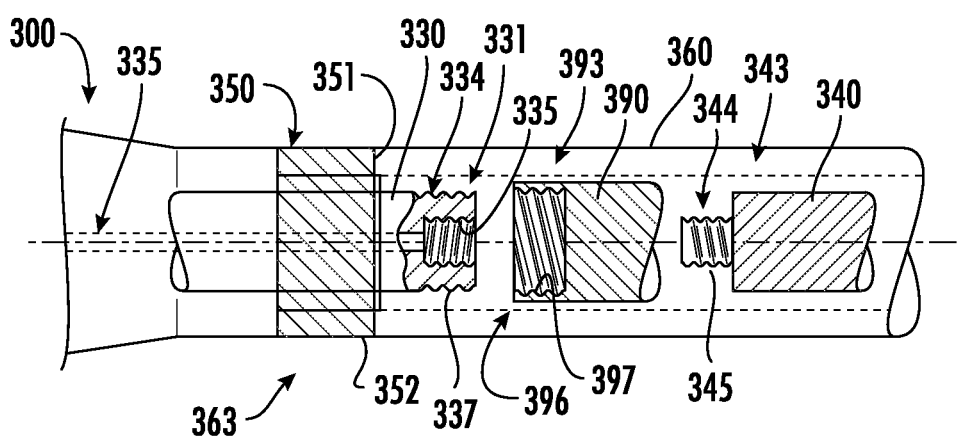
FIG. 7 illustrates an embodiment of a threaded installation and removal mechanism which may be used with a locking ring such as illustrated in FIG. 6.

An alternate embodiment of an advancement mechanism 370 configured and arranged to advance a locking ring 150 relative to a center core 130 (preferably in a controllable manner), as well as to maintain the locking ring 150 in a desired position to maintain a plug 100 in an expanded configuration, is illustrated in FIGS. 6 and 7. The locking ring 350 of the embodiment of FIGS. 6 and 7 may be substantially similar to the locking ring 250 of FIG. 5, with like reference numbers, increased by 100, being used to indicate elements of locking ring 350 similar to elements of locking ring 250, with redundant description accordingly being omitted. In contrast with the embodiment of FIG. 5, instead of a center core having a pawl and teeth (as in the embodiment of FIG. 5), the advancement mechanism 370 of the embodiment of FIGS. 6 and 7 has advancement threads 374 (on the center core 330 in the embodiment of FIGS. 6 and 7) along which the pawl 372 (associated with the locking ring 350 in the embodiment of FIGS. 6 and 7) rides (such as by the pawl 372 being positioned in gaps or grooves between the teeth and moving along such gaps or grooves), as shown in FIG. 6. Such threads may permit a finer adjustment of the position of the locking ring 350 than may be achieved with teeth which are generally a fixed distance apart. The locking ring 350 and the center core 330 thus are rotated relative to each other (in contrast with being moved axially with respect to each other, as in the embodiment of FIG. 5) to advance the locking ring 350 either towards the distal end 333 of the center core 330 or towards the proximal end 331 of the center core 330 to bring the ends of the plug 100 together or apart, respectively, as desired. A quick release 380 similar to the quick release 280 of the embodiment of FIG. 5 may be used in conjunction with the advancement mechanism 370. For the sake of brevity, elements of the quick release 380 illustrated in FIG. 6 similar to the quick release 280 illustrated in FIG. 5 are indicated with like reference numbers as in FIG. 5, increased by 100, and are not further described herein, reference being made to the above description of such elements as in FIG. 5. It is noted that one difference between the advancement mechanism 270 illustrated in FIG. 5 and the advancement mechanism 370 illustrated in FIG. 6 is that instead of the pawl 372 being moved in and out of engagement with teeth, the pawl 372 is moved in and out of engagement between threads to facilitate withdrawal without needing to rotate the locking ring 350 and/or the center core 330. As in the embodiment of FIG. 5, the quick release 380 of the embodiment of FIG. 6 may be actuated during deployment to adjust the expanded configuration of the plug 100 as desired.

As may be appreciated, in order to advance or retract the locking ring 350 relative to the center core 330 of the embodiment of FIG. 6, a deployment device and, optionally additionally or alternatively, a removal device capable of rotating the center core 330 may be useful. One embodiment of a deployment device 340 and a removal device 390 which may be used to move the locking ring 350 and center core 330 relative to each other to advance or retract the locking ring 350 to expand or unexpand a plug 300 is illustrated in FIG. 7. Similar to the embodiments illustrated in FIGS. 2 and 3, the deployment device 340 has a distal mating section 344 configured to mate with a proximal mating section 334 associated with a proximal end 331 of the center core 330 to couple the deployment device 340 and the center core 330. As illustrated in FIG. 7, the deployment device distal mating section 344 may have external threads 345 which may threadingly engage internal threads 335 in the center core proximal mating section 334. It will be appreciated that a reverse threading arrangement, with internal threads on the deployment device 340 and external threads on the center core 330, is within the scope of the present disclosure as well. It will be further appreciated that other modes of coupling the deployment device 340 and the center core 330 are also within the spirit and scope of the present disclosure. If a threaded engagement between the deployment device 340 and the center core 330 is used, the threading direction (e.g., clockwise or counterclockwise/anticlockwise) is selected to correspond with the threading direction of the advancement threads 374 so that rotation of the deployment device 340 causes rotation of the center core 330 to cause distal advancement of the locking ring 350 to expand the plug 300 to be deployed for occlusion. As the center core 330 rotates, the pawl 372 associated with the locking ring 350 rides along the advancement threads 374 on the center core 330.

Figure 8:
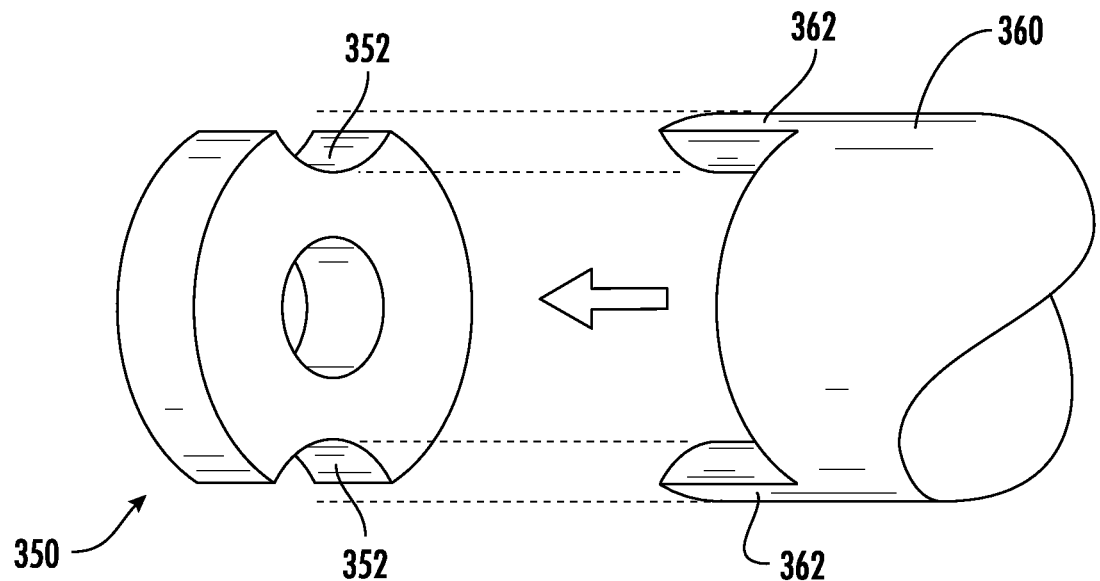
FIG. 8 illustrates a perspective view of a mating installation and removal mechanism which may be used with a pyloric plug such as illustrated in FIGS. 1-4 and optionally, in particular, with the threaded installation and removal mechanism illustrated in FIG. 7.

It will be appreciated that if the engagement of the center core 330 and the locking ring 150 is via components or sections with circular cross-sections, the locking ring 350 preferably should be prevented from rotating so that rotation of the center core 330 effects axial translation of the locking ring 350. In some embodiments, another component of the occlusion system inhibits the locking ring 350 from rotating by being coupled to the locking ring 350 and being held against rotation to thereby hold the locking ring 350 against rotation as well. For instance, a component of the occlusion system which may be inhibited from moving (e.g., rotating) may be engaged or mated or coupled with the locking ring 350 to inhibit movement, such as rotation, of the locking ring 350. In some embodiments, a delivery device 360 has a distal end 363 with a mating profile 362 shaped and configured to engage and mate with a corresponding mating profile 352 at a proximal end 351 of the locking ring 350. In an embodiment illustrated in FIG. 8, the delivery device mating profile 362 may be in the form of one or more tangs extending distally from the delivery device 360, and the mating profile 352 on the locking ring 350 may be in the form of a profile shaped and configured to correspond with and to receive the delivery device mating profile 362, such as one or more cutouts or receiving areas, as illustrated in FIG. 8. It will be appreciated that a reverse configuration, with a component or extension on the locking ring may be received in a receiving area in the delivery device shaped and configured to correspond with and to receive the extension, is also within the scope of the present disclosure. Moreover, other configurations of mating profiles, including profiles on system components other than a delivery device, are within the scope and spirit of the present disclosure. Referring the advancing mechanism 270 illustrated in FIG. 5, it will be appreciated that if the center core 230 has a circular cross-section, similar restraint on the locking ring 250 may be desired. However, the cross-section of the center core 230 may be noncircular to avoid the need for retraining rotation of the locking ring 250, or the teeth may be formed as grooves extending around the entire periphery of the center core 230 with a circular cross-section, thereby obviating the need for alignment of the pawl 272 and the teeth 274.

If it is desired to remove a plug 100 with a locking ring 350 as illustrated in FIGS. 6 and 7, it may be difficult to use the deployment device 340 if configured as illustrated in FIG. 7 because rotation of the deployment device 340 in an opposite direction will generally simply result in release of the deployment device 340 from the center core 330 without rotating the center core 330 to effect advancement of the locking ring 350. Accordingly, in some embodiments a separate removal device 390 may be used. If a threaded removal device 390 is used, the threading preferably is in a direction opposite the threading direction of the mating sections 334 and 344 of the center core 330 and the deployment device 340, respectively. Typically, the threading direction of the removal device 390 is also in a direction opposite the threading direction of the advancement threads 374.

An embodiment of a removal device 390 is illustrated in FIG. 7. As illustrated, a distal end 393 of the removal device 390 has a distal mating section 396 with internal threads 397 which may threadingly engage external threads 337 on the center core proximal end 331, such as on the center core proximal mating section 334. Of course, a reverse arrangement, with internal threads on the removal device 390 engaging external threads on the center core 330, is within the scope of the present disclosure as well. As the removal device 390 is rotated in a direction opposite the deployment direction (the direction in which the deployment device 340 and center core 330 are rotated to advance the locking ring 350 to move the proximal end 301 of the plug 300 closer to the distal end 303 of the plug 300 to expand the plug 300), the locking ring 350 is advanced proximally to move the proximal end 301 of the plug 300 away from the distal end 303 of the plug 300 into the unexpanded configuration for removal from the deployment site. Typically, the locking ring 350 is moved proximally until the plug 300 is sufficiently reduced in cross-sectional dimension to be removed, such as within a catheter (e.g., similar to the deliver catheter 102). The removal device 390 may remain coupled with the center core 330 and moved proximally to move the plug 300 proximally therewith for removal from the deployment site.

Figure 9:
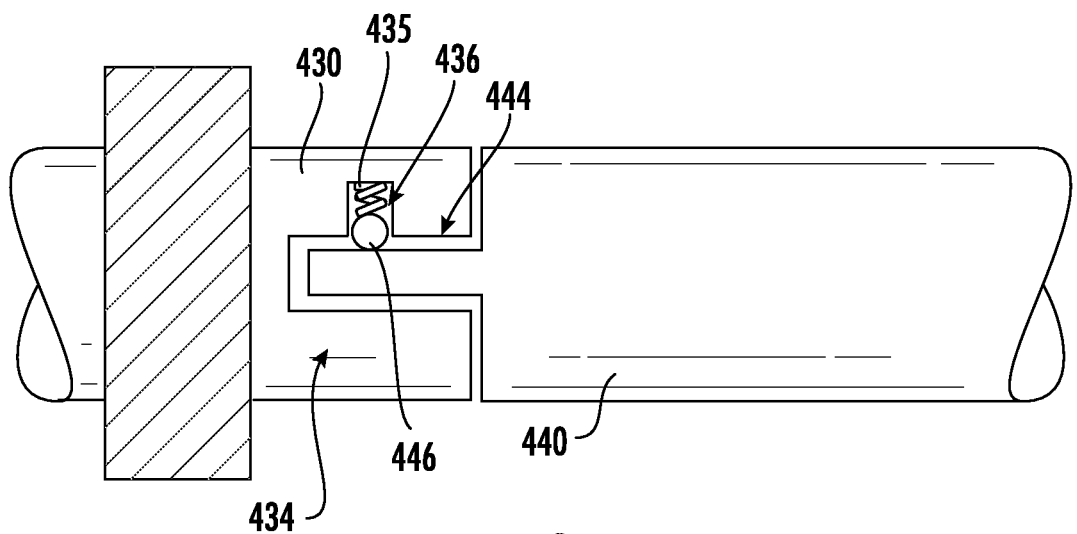
FIG. 9 illustrates an embodiment of a spring and ball installation and removal mechanism which may be used with a pyloric plug such as illustrated in FIGS. 1-4.

As noted above, other deployment device and removal device configurations for use with plugs and advancement mechanisms such as described herein are within the scope and spirit of the present disclosure. As used with an advancement mechanism 370 as illustrated in FIGS. 6 and 7, a deployment device and a removal device preferably are mutually configured to allow rotation of the center core 330 in both directions (clockwise and counterclockwise/anti-clockwise) so that the locking ring 350 is advanceable either proximally or distally as desired. An embodiment of a deployment device configuration and removal device configuration which may be used to effect mating of a deployment device 440 with a plug center core 430 to deploy a plug 100 is illustrated in FIG. 9. It will be appreciated that the deployment device 440 of FIG. 9 may be used both to deploy as well as to remove the plug 100. In the embodiment illustrated in FIG. 9, the deployment device 440 has a distally-extending distal mating section 444 shaped and configured to mate with a proximally-extending proximal mating section 434 on the center core 430. The deployment device 440 and the center core 430 may be engaged or coupled together by relative axial movement, and held together to allow rotation of the deployment device 440 (generally controlled proximally of the occlusion system) to rotate the center core 430 to operate an advancement mechanism such as described herein (e.g., advancing mechanism 370) to advance or retract a locking ring 150 (e.g., locking ring 350). In some embodiments, as illustrated in FIG. 9, engagement of the deployment device 440 and the center core 430 may be accomplished by a ball 436, on one of the deployment device 440 and center core 430, being biased, such as by a biasing member 435 (e.g., a spring), into engagement with a seat 446, such as a dimple, on the other of the deployment device 440 and center core 430. Although the ball 436 and biasing member 435 are provided on the center core 430, and the seat 446 is provided on the deployment device distal mating section 444 in the embodiment of FIG. 9, a reverse arrangement is within the scope of the disclosure. Moreover, although a biasing member 435 is shown as a coil spring, other configurations of biasing members are within the scope of the present disclosure.

It will be appreciated that relative axial movement between the deployment device 440 and the center core 430 may be accomplished by relative axial movement (pushing together or pulling apart) the respective mating sections 434, 444, the ball 436 being biased into or out of engagement with the seat 446 by the relative movement of the mating sections 434, 444. It will further be appreciated that it is generally desirable that the relative rotational movement between the deployment device 440 and the center core 430 does not cause the ball 436 to disengage from the seat 446 (as may occur with relative axial movement), which could result in separation of the deployment device 440 and the center core 430 during advancement. In some embodiments, the cross-sectional shapes of the mating sections 434, 444 are non-circular to inhibit relative rotation therebetween and thereby to inhibit dislodgement of the ball 436 from the seat 446. Once the deployment device 440 has been rotated to rotate the center core 430 to deploy the plug 100, the deployment device 440 may be removed by being pulled proximally with respect to the center core 430. When removal of the plug 100 is desired, the proximal end of the deployment device 440 is once again moved towards the center core 430 to reengage the distal mating section 444 thereof with the proximal mating section 434 of the center core 430.

As noted above, the proximal end 131 of the center core 130 may extend outside the plug 100 when the plug 100 is in the expanded, deployed configuration. As such, removal of a plug 100, 300 as shown in FIGS. 2-9 is desired or indicated, the proximal end 131 of the center core 130 may be accessible for coupling with a deployment device 140 to hold the center core 130 to allow relative movement between the locking ring 250, 350 and the center core 130, 230, 330 (such as upon actuation of the quick release 280, 380) to return the plug 100 to its unexpanded configuration, as well as to proximally withdraw the center core 130, 230, 330 along with the plug 100 for removal of the plug 100. In some embodiments, the above-described quick release 280, 380 may be actuated to allow the locking ring 250, 350 to be moved proximally to allow the plug 100 to return to its unexpanded configuration, such as if removal is desired or indicated. It will be appreciated that other manners of accessing the plug 100 to return it to an unexpanded configuration for removal are within the scope and spirit of the present disclosure.

If removal of a plug 100 as illustrated in FIGS. 1-9 is ultimately indicated, in some embodiments, the outer surface of the plug 100 may have anti-migration-features, such as surface texturing or a contoured surface (e.g., a rippled or bumpy exterior surface), patterns at a different level from the outer surface (e.g., raised shapes or patterns, such as raised bumps), etc. Various anti-migration features may be used in conjunction with a plug such as disclosed herein, such as the silicone plug of FIGS. 1-9. The anti-migration features substantially prevent tissue ingrowth so that atraumatic removal of the plug 100, 300 may be accomplished. Additionally, or alternatively, at least some of the outer surface area may allow a desired extent of tissue ingrowth. For instance, a mesh or net surface may be provided in selected regions to allow a degree of ingrowth to create a natural anchor.

The occluding device described above in connection with FIGS. 1-9 presents a substantially solid plug surface (which is substantially impervious to substantially prevent matter passing therethrough) to engage the lumen tissue in a relatively non-traumatic manner when deployed, and which may also be removed from the deployment site in a relatively non-traumatic manner. The plug may be considered an internally-enclosed and/or fully-encapsulated tube. Deployment and removal of a flexible occluding device with such characteristics may be achieved other than by relative movement of ends of a substantially tubular element (as described with respect to the embodiments of FIGS. 1-9). In some embodiments, a substantially solid plug surface fully enclosing and/or encapsulating an interior is presented by an occlusion device or plug in the form of a balloon-type plug 500, as in the embodiments illustrated in FIGS. 10-12.

Some prior art balloon-type plugs are compliant to fit in the deployment site and comply or conform to the shape of the deployment site. Such balloons generally present very little risk of trauma to the tissue at the deployment site.

However, if the balloon is too compliant, although it may be able to conform closely to the deployment site, the balloon may not sufficiently withstand pressures, such as from the stomach, and may be dislodged from the deployment site over time. In contrast, if a balloon formed of a compliant material is inflated to the extent that it is less compliant, or a noncompliant material is used, the balloon may not sufficiently absorb forces as may be desired in a dynamic environment such as regions controlled by the autonomic system which may undergo various involuntary movements (e.g., peristalsis in the gastrointestinal tract, or typical movement of the pylorus, or movement of a pylorus in reaction to the presence of a plug therein). Moreover, if the balloon is too noncompliant, instead of absorbing forces to some degree, the balloon instead may dislodge as a result of the impact. A balloon-type plug 500 formed in accordance with principles of the present disclosure may be formed of a noncompliant yet somewhat elastic material, or, in at least in some embodiments, a noncompliant material not expanded to a point that the balloon is not at all compliant, and typically expanded to a point that the plug is not at risk of becoming dislodged. Accordingly, in some embodiments a balloon-type plug 500 formed in accordance with principles of the present disclosure is capable of absorbing some forces to deform so that the balloon stays in its deployed location and does not dislodge, and is less traumatic to the tissue at the deployment site than other more rigid materials may be.

As with the embodiment of FIGS. 1-9, in some embodiments, the plug 100 is formed of an adaptable resilient material, particularly when expanded, such as silicone or rubber. It will be appreciated that the material also is generally selected based on the environment in which the plug 500 is to be deployed. For instance, if the plug 500 is to be deployed across the pylorus, the material of the plug must be selected to withstand the extreme pH environment (very low pH, high acidity) in the stomach. The material may be selected to be sufficiently flexible to adapt to the anatomy in which the plug 100 is deployed and expanded, yet to remain in the adapted configuration and not "give" too much and shift or dislodge from its desired final deployment position. For instance, the material may be selected and the plug 100 wall formed such that the expanded plug 100 absorbs movement, such as may occur naturally at the deployment site, at least more so than would be absorbed by a stent or another less adaptable material. Moreover, the plug 100 material may present a substantially smooth outer surface to contact the body lumen in a manner that may be considered less traumatic than contact by a stiffer material. Anti-migration features as described in connection with the plug 100, 300 of FIGS. 1-9 may optionally be provided. As with the material of the plug 100 of FIGS. 1-9, the material of the plug 500 of FIGS. 10-12 may be solid/relatively impermeable or impervious to passage of matter (e.g., liquids or solids) therethrough so that, when expanded, the plug 500 blocks passage of matter therethrough.

Figure 10:
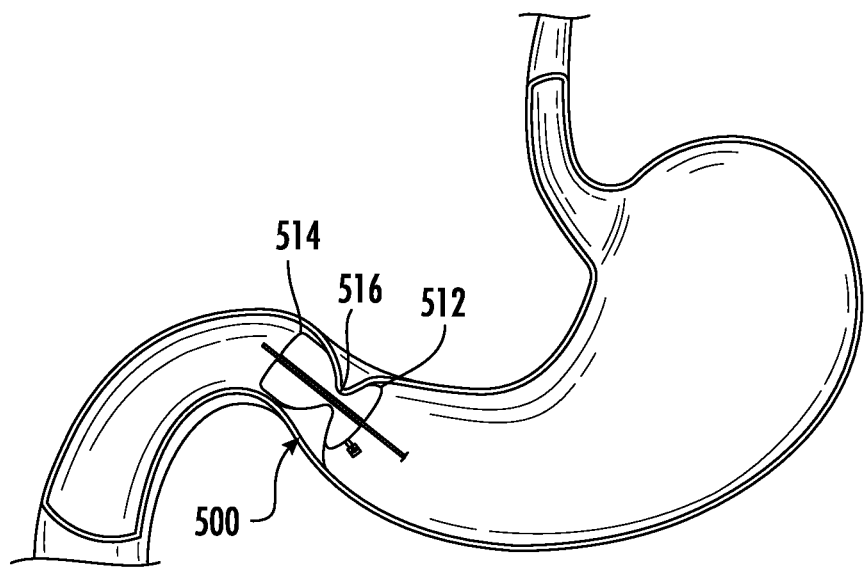
FIG. 10 illustrates another embodiment of a lumen occlusion device or plug in accordance with the present disclosure positioned in a pylorus.
Figure 11:
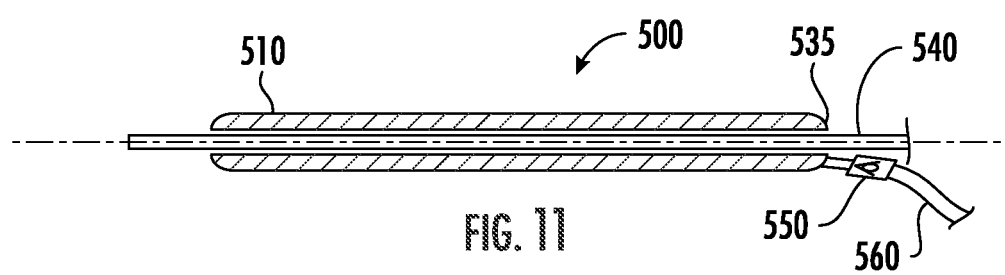
FIG. 11 illustrates the lumen occlusion device or plug of FIG. 10 in an unexpanded configuration for insertion into a body lumen.
Figure 12:
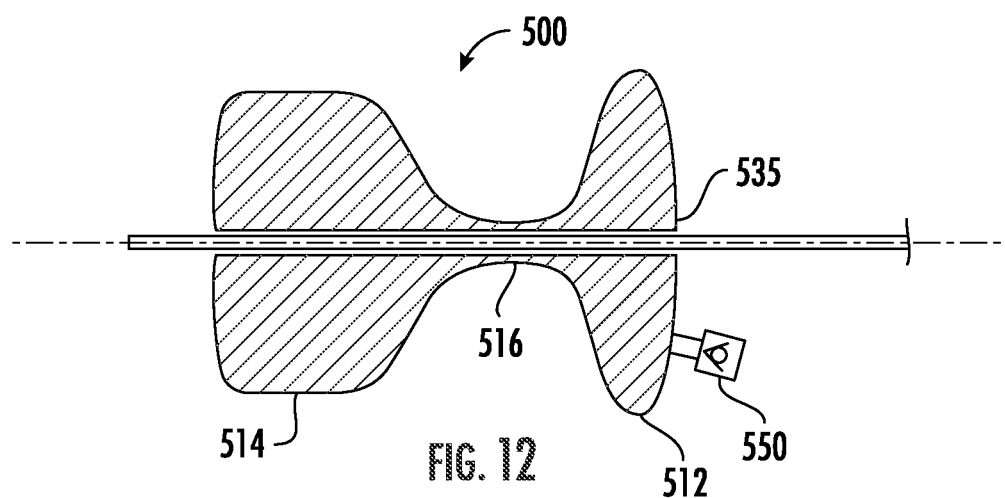
FIG. 12 illustrates the lumen occlusion device or plug of FIG. 11, in cross-section, in an expanded configuration.
Figure 13:
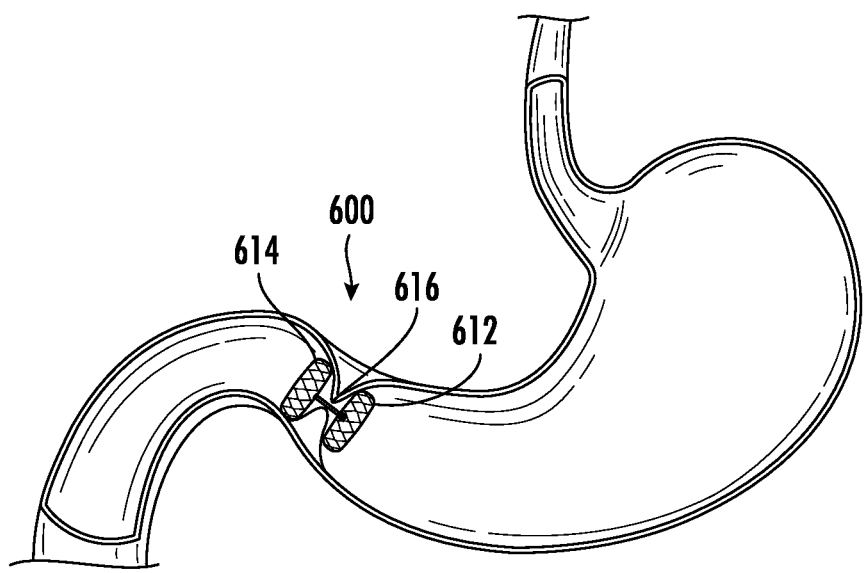
FIG. 13 illustrates another embodiment of a lumen occlusion device or plug in accordance with the present disclosure positioned in a pylorus.

In some embodiments, like the plug 100 of FIGS. 1-9, the plug 500 of FIGS. 10-12 may be considered an internally enclosed, fully encapsulated tube so that no material passes through the plug 100. In some embodiments, the plug may be substantially solid/impermeable, or may have an impermeable layer, so that material does not pass through the plug 500.

It will be appreciated that a balloon formed of a compliant material generally is inflated by volume to conform to or to occlude the anatomy of the deployment site. However, such balloons have to be inflated sufficiently to be usable (e.g., to conform to the deployment site and to remain in place), and in such inflated state may not absorb a lot of movement. In some embodiments formed in accordance with principles of the present disclosure, a balloon-type plug 500 has a predetermined shape such that, when expanded, the balloon expands to a predetermined shape. As such, internal pressure of the filling fluid does not determine the expansion shape or conformity to deployment site. Instead, the final predetermined shape is determined by the initial predetermined shape of the balloon-type plug 500. Accordingly, less pressure may need to be exerted on the tissue at the deployment site when the balloon-type plug 500 is deployed than may be created by a typical fluid-filled balloon because the balloon-type plug 500 of the present disclosure may substantially conform to the deployment site (e.g., mate with the surrounding anatomy) because of its inherent shape, thereby resisting migration, whereas a typical balloon conforms as a result of inflation, and may become substantially noncompliant when filled sufficiently to occlude the deployment site. Nonetheless, the material from which the plug 500 is formed may still be sufficiently compliant to have some "give" to absorb movements or other forces at the deployment site.

In some embodiments, a balloon-type plug 500 is formed to have a predetermined expanded shape and/or profile and/or size selected to mate with or otherwise correspond with or otherwise be based on the deployment site. In an embodiment, such as illustrated in FIG. 10, the plug 500 may be shaped to be deployed across a pylorus, and has a tubular member 510 formed with a predetermined shape such that when expanded, the plug 500 naturally expands to have an expanded plug proximal section 512, an expanded plug distal section 514, and an intermediate neck section 516. The body of the balloon-type plug 500 may be formed as a single balloon. Since the shape of the tubular member 510 determines the expansion shape (in contrast with compliance of the balloon walls with the shape of the deployment site), if a single balloon is positioned across a pylorus, there is no need for a separate distal balloon to be inflated before a proximal balloon is inflated, as generally would be the case in prior art balloons. In an embodiment in which a single balloon shaped to match/mate with the lumen opening (e.g., the pylorus) is used, once the balloon is inflated to the plug profile, the balloon is substantially locked in place until deflation occurs, later, if and when desired. The procedure time would be reduced with a single balloon, as only a single deployment across the lumen opening is effected.

As illustrated in FIGS. 10 and 12, the example of a pyloric plug 500 may have a substantially wine-glass shape. The waist or stem section of the wine-glass shape corresponds to the intermediate neck section 516 and is configured such that when the device is implanted, the plug intermediate neck section 516 is seated at or across the pyloric sphincter. The bowl section corresponds to the plug proximal section 512 and is shaped and sized and configured to fit within and substantially conform or correspond to the portion of the stomach surrounding the pylorus. The foot section corresponds to the plug distal section 514 and is shaped and sized and configured to fit within and substantially conform or correspond to the duodenum. In some configurations, the plug distal section 514 is more particularly shaped and sized and configured to fit within and substantially correspond to the duodenal bulb, near the stomach. The material of the plug 500 is selected not only for conforming to the desired degree (sufficiently to occlude the lumen, yet not too compliant as to possibly dislodge, as described above) once the plug 500 has been inflated to its predetermined inflation configuration, but also to withstand environmental pressures at the deployment site. For instance, a gastric environment may create a high pressure environment. The radial dimensions of the plug proximal section 512 and the plug distal section 514 may be critical to assure that the plug 500 is not pushed through the pylorus by pressure building up on the gastric side of the plug 500. If desired, two expanding rings (e.g., made of balloon material, such as thicker balloon material) may be provided under the plug proximal section 512 and the plug distal section 514 to give the plug 500 more rigidity and/or structural integrity (e.g., to withstand greater radial expansion forces) if required depending on indications. Such rings may be separate or integrally formed (e.g., comolded) with the tubular member 510 forming the plug 500. Alternatively, or in addition, the tubular member 510 may have a thicker wall thickness, such as to impart greater radial force/structural integrity once inflated, in selected regions, such as the regions of the plug proximal section 512 and the plug distal section 514.

It will be appreciated that in order to deploy a balloon-type plug 500, the tubular member 510 of the balloon is in a generally unexpanded or deflated or collapsed configuration, as shown, for example, in FIG. 11. The plug 500 in its substantially low-profile may be delivered to the deployment site within a delivery catheter (not shown for the sake of simplicity, but which may be similar to the delivery catheter shown in connection with the plug 100 illustrated in FIGS. 1-9) or in accordance with other delivery manners known in the art.

In one embodiment, the tubular member 510 may be considered to enclose the full interior 518 of the tubular member 510 such that the exterior of the balloon-type plug 500 surrounds and encloses or encapsulates the interior volume of the plug 500. In such embodiment, the tubular member 510 may be considered to fully enclose a single interior space uninterrupted by a passageway or lumen therethrough (e.g., a solid cylinder with a hollow interior to be filled with inflation fluid upon deployment). In other embodiments, the tubular member 510 has an inner lumen 535 through which a guidewire 540 may be passed to facilitate guidewire-assisted delivery of the tubular member 510 to the deployment site. In such embodiments, the tubular member 510 may be a double-walled tube (e.g., substantially hollow double-walled cylinder with an interior chamber which is substantially toroidal, to be filled with inflation fluid upon deployment). Once the plug 500 has been deployed, and the guidewire 540 removed, the lumen 535 may allow for release of back pressure or equalization of pressure differentials (such as discussed above in connection with the plug 100 of FIGS. 1-9). However, the lumen 535 preferably is small enough that matter does not pass through the plug 500. In some instances, the guidewire lumen may eventually become occluded, itself, such as with bolus or other matter from the stomach, or may close from pressure at the deployment site (e.g., the sphincter may exert sufficient radially inward pressure to close the guidewire lumen).

The tubular member 510 may be shaped during formation thereof so that it achieves the desired final expanded shape or configuration, such as to correspond to the desired deployment site. Various modes of shaping a tubular member such that it expands to a predetermined shape are known in the art, such as casting or molding (e.g., blow molding, vacuum molding, stretch blow-molding, insert molding, injection molding, etc.) and thus need not be detailed herein, the disclosure not being limited by the manner in which the balloon-type plug 500 is formed.

The tubular member 510 may include a valve 550. An inflation lumen 560 generally may be coupled to the valve 550 to fluidly communicate the tubular member 510 with an inflation source to fill the tubular member 510 (e.g., with air, saline, water, etc.) to expand the tubular member 510 into its predetermined expanded shape. A cross-sectional view of an example of a predetermined expanded shape is shown in FIG. 12. As discussed above, it will be appreciated that other shapes are within the scope and spirit of the present disclosure, generally being selected based on the deployment site. In some embodiments, a one-way valve is used so that the inflation lumen 560 simply needs to be disconnected from the valve 550 once the balloon has been sufficiently inflated.

As with the plug described with reference to the embodiments of FIGS. 1-9, a balloon-type plug 500 may be removable from the deployment site if desired or indicated by the procedure or circumstances. A generally preferred manner of removing the plug 500 involves releasing the filling fluid therefrom to cause the balloon to return to a sufficiently unexpanded configuration for removal (e.g., via a catheter or other means known or heretofore developed in the art). In some embodiments, the inflation valve 550 may be actuated to release the fluid from the interior 518 of the balloon. A retrieval loop or suture may be provided on the valve and grasped, such as by a grasper or suture, to cause the valve to deflate the balloon-type plug 100. Alternatively, the valve 550 may simply be opened, removed, broken, or otherwise disengaged to allow free flow of fluid from within the balloon to outside the balloon. Another option involves puncturing or cutting or lacerating or otherwise disrupting the integrity of the balloon wall to allow the fluid to escape therefrom to cause the balloon to deflate. For instance, the balloon integrity can be disrupted by being punctured via the valve 550, or by simply pulling out or otherwise removing the valve 550. A needle, such as for FNA (fine needle aspiration), may be used to aspirate fluid or evacuate gas from the balloon, either through the balloon wall or through the valve 550. The unexpanded or deflated plug 500 may be grasped or otherwise retrieved and removed in any desired manner known in the art or heretofore developed.

It will be appreciated that an expandable polymeric occlusion device or plug, such as described above and as may be appreciated with reference to various aspects, features, and embodiments illustrated in FIGS. 1-12, provides various benefits over other types of plugs, such as those formed by other more rigid materials (e.g., metals, alloys, and other less-flexible materials than silicone or rubber or the like), or other wall structures (e.g., discontinuous wall structures, non-smooth surfaces, etc.). For instance, flexible polymeric materials, used to form expandable polymeric plugs as described herein, generally are corrosion resistant; have outer surfaces which may be controlled or formed to be smooth; may be shaped to be inherently relatively atraumatic (e.g., initially formed, at the outset, without sharp edges or burrs); may be shaped or otherwise formed to have antimigration features (e.g., integral to the wall member); and do not present opportunities for broken welds or wires. Moreover, because the expandable plugs described thus far are expanded by application of an external force thereto (either drawing together proximal and distal ends thereof, or introducing material therein to cause expansion thereof), there are no inherent radial expansion forces, as with a self-expanding plug, which may not always be desirable, depending on the circumstances of and indication for deployment. The pull-out force or apposition force would be created by the lumens apposing the flanges. The deployed expanded profile of the plugs described thus far herein is responsible for creating a natural plug around the lumen opening in which the plug is deployed, i.e., the shape in contrast with expansive forces is responsible for holding the plug in place. In so doing, the plugs stay in the desired deployed position by crossing over/transitioning the lumen opening and sitting on either side of the opening and being held in place by flanges or larger-profile sections. Because radial forces are not required to hold the plugs in place, the plugs have a less traumatic effect on the anatomy then may occur from plugs relying on expansive forces to be held in place.

Although a polymeric occlusion device or plug formed from a polymeric tubular member has various benefits as described above, the present disclosure also includes disclosure of stent-like occlusion devices or plug 600, as illustrated in FIGS. 15-21. As may be observed with reference to FIG. 15, in some embodiments a stent-like plug 600 includes a plug proximal section 612 formed from a first stent (and thus alternately reference herein as a proximal stent section 612), a plug distal section 614 formed from a second stent (and thus alternately referenced herein as a distal stent section 614), and a plug intermediate section 616 extending therebetween. In some embodiments, the first and second stents are substantially similar. In some embodiments, the plug intermediate section 616 is a wire connector, suture connector, connecting shaft, pin, or the like, coupled to each stent. In some embodiments of a plug intermediate section 616, a lumen may extend therethrough to accommodate backpressure or equalize pressure differentials across the plug 600, such as described above in connection with the plug 100 of FIGS. 1-9.

Although other deployment sites are within the scope of the present disclosure, the example of a stent-like plug 600 illustrated in FIG. 15 is deployed across a pylorus, with the plug proximal section 612 positioned in a stomach and a plug distal section 614 positioned in a duodenum, and the plug intermediate section 616 extending across the pylorus. In some embodiments, the plug proximal section 612 and the plug distal section 614 are two separate stents apposing each other such as across a pylorus. In some embodiments, the plug intermediate section 616 is centered onto the stent profiles of the plug proximal section 612 and the plug distal section 614.

As with the other occlusion devices or plugs disclosed herein, some embodiments of stent-like plugs 600, 700, and 800, which are now to be described, are delivered in a substantially unexpanded configuration, are expanded at the deployment site, and are manipulated by engaging a component thereof to return to the unexpanded configuration for removal as desired or indicated. Moreover, as with the other occlusion devices or plugs disclosed herein, some embodiments of stent-like plugs 600, 700, and 800, which are now to be described, present a smooth exterior surface to the tissue at the deployment site to mitigate or eliminate any trauma from the presence of the plug 600, 700, and 800. Also as with the other occlusion devices or plugs disclosed herein, some embodiments of stent-like plugs 600, 700, 800, which are now to be described, may be configured to occlude the deployment site by being substantially impermeable to the passage of solids or liquids or other matter therethrough. In some embodiments, although the stent sections of the stent-like plugs 600, 700, 800 may be formed similar to prior art stents (e.g., an elastic tube laser cut into cells; a network of struts or other elements interengaged into a substantially tubular structure; a tubular structure formed of a mesh of braided, woven, knitted, twisted, etc. filaments or wires; or other stent-like structures known in the art or heretofore developed, each of which permitting radial expansion or contraction as desired or indicated), unlike the prior art, the stent-like plugs 600, 700, 800 disclosed herein may be covered to inhibit tissue ingrowth. A tissue-growth-inhibiting covering 919 may be formed of or covered or coated with any known tissue-growth-inhibiting substance known or heretofore developed in the art (e.g., a non-porous flexible coating such as silicone, urethane, etc.), and with any known or heretofore known process (such process not forming a part of the present disclosure), and may extend over the stent sections 612, 614, 712, 714, 812, 814 (such as over at least the entire outer surfaces thereof) to seal off passage of matter through the lumen completely. Instead of or in addition to a separate covering 919, a polymer coating may be provided on the surface of the material from which the stent sections 612, 614, 712, 714, 812, 814 are formed, and at least the surfaces contacting tissue at the deployment site. A covering or coating also may present a smoother outer surface to the tissue at the deployment site, reducing any risk of trauma which may be associated with potentially sharp components of a prior art stent.

The stents forming the proximal stent section 612 and the distal stent section 614 may be similarly-formed or similarly-structured opposing stents. In some embodiments, the opposing stents are configured to act against each other to stay in place and/or in the desired expanded configuration. In some embodiments, the proximal stent section 612 and distal stent section 614 have profiles which allow each stent to move independently allowing flexibility, as well as to counteract movement and migration, and/or to absorb the natural movement or rhythms of the deployment site. For instance, the profiles may be configured to work with the natural anatomical movements within the gastric region illustrated in FIG. 15, such as accommodating pylorus sphincter movement both to/from the gastric side and the duodenal side.

Figure 14:
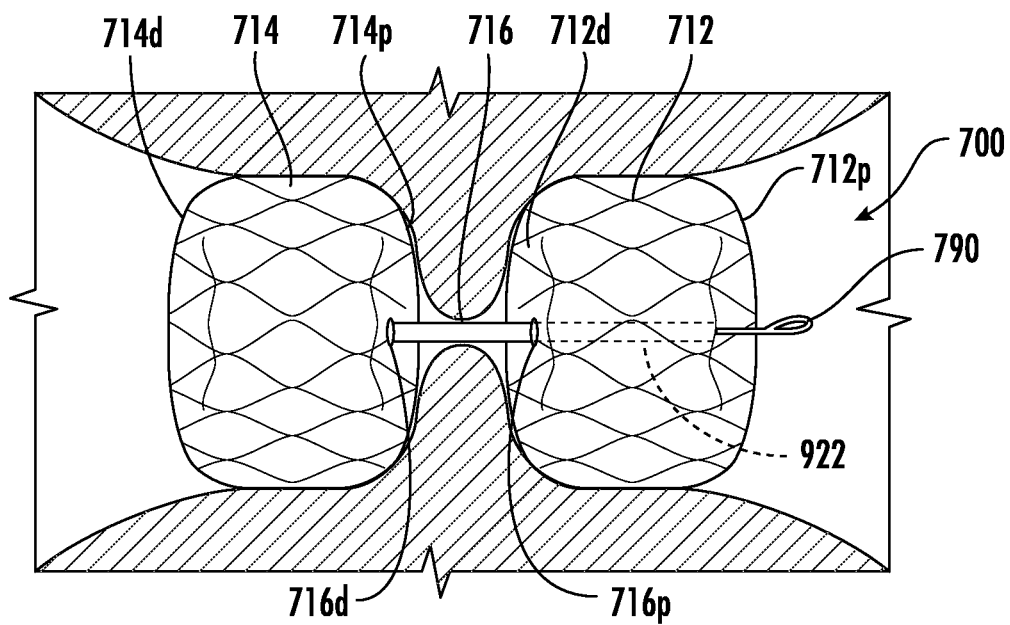
FIG. 14 illustrates an embodiment of a lumen occlusion device or plug as in FIG. 13.
Figure 20:
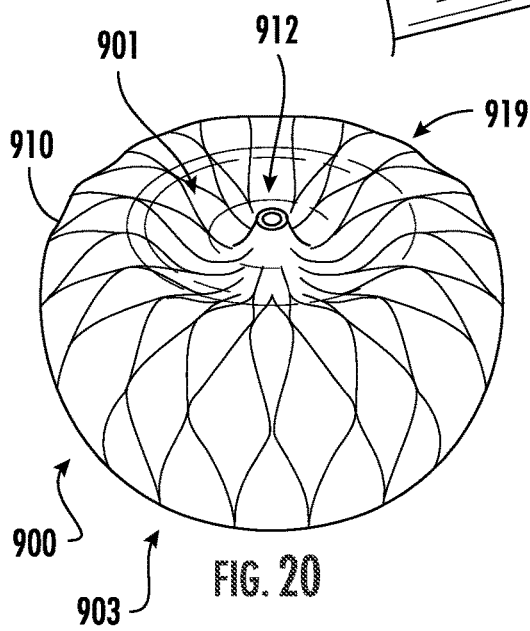
FIG. 20 illustrates a perspective view of an example of a stent configuration which may be used in a lumen occlusion device or plug as in FIGS. 13-18.
Figure 21:
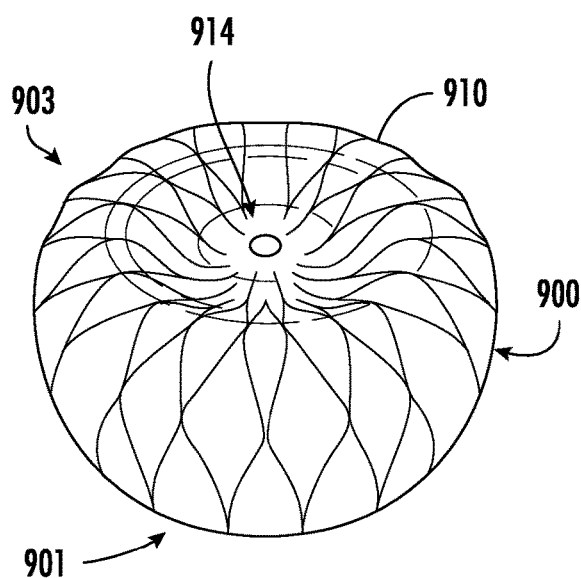
FIG. 21 illustrates a bottom perspective view of the stent configuration of FIG. 20.

An example of a stent configuration 900 which may be used for the stent sections 612, 614, 712, 714, 812, 814 of the plugs 600, 700, 800 illustrated in FIGS. 13-18 is illustrated in FIGS. 20 and 21. In some embodiments, the stent configuration 900 has a substantially closed end 901 and an opposite open end 903. As may be appreciated with reference to FIG. 21, the stent wall 910 of the stent configuration 900 gently curves inwardly at the open end 903 thereof and toward the opening 914, which may, in some embodiments, be substantially centrally located. As such, even though the stent configuration 900 is technically "open" at the open end 903, the open end 903 presents an atraumatic surface, a majority of which is the outer surface of the stent wall 910. Because the stent wall 910 may curve inwardly, the free edges of the stent wall 910 preferably are at least parallel to if not facing away from the tissue at the deployment site (e.g., the pylorus as illustrated in FIG. 14).

A substantially centrally-positioned stent mating section 912 configured for engagement with at least a plug intermediate section 616, 716, 816 may be provided in the stent closed end 901. In some embodiments, the stent mating section 912 is fixed to (e.g., welded on) an end of a plug intermediate section 616, 716, 816 to couple a corresponding stent configuration 900 thereto. In some embodiments, the stent mating section 912 is configured for engagement with a deployment device 640 such as shown in use with the stent-like plug 700 in FIG. 15 (to be described in further detail below). The stent mating section 912 may be threaded (e.g., with internal threads) or otherwise configured to engage with another component and/or device.

The open end 903 of the stent configuration 900 has an opening sufficient to accommodate passage therethrough of a component of the stent-like plug 600, 700, 800 (e.g., a plug intermediate section 616, 716, 816) or the occlusion system associated therewith (e.g., a deployment device), as to be described in further detail below in connection with some illustrated embodiments. Preferably, the opening is no larger than required for such passage so that gastric matter does not pass therethrough during the deployment period of the stent (potentially interfering with operation or visualization or removal of the stent). If desired, a valve as known or heretofore known in the art (e.g., a self-closing valve, such as an elastomeric or rubber valve) may be positioned in the opening 914 to prevent undesired passage of undesired matter therethrough while permitting passage of a component as needed. In some embodiments, the valve is configured to open when a component or device to be passed through the opening 914 is pressed against the valve.

Figure 18:
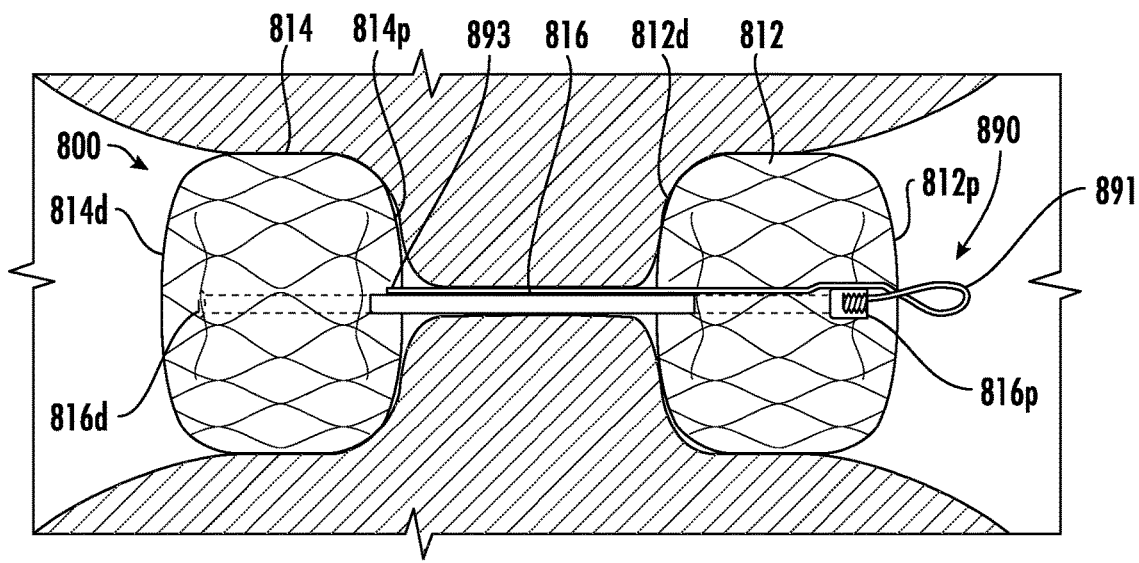
FIG. 18 illustrates another embodiment of a lumen occlusion device or plug in accordance with the present disclosure positioned in a pylorus.

Turning now to FIGS. 14-18, two embodiments of a stent-like plug 600 are illustrated. One distinction between the stent-like plug 700 of FIGS. 14-17 and the stent-like plug 800 of FIG. 18 is the manner in which the plug intermediate sections 716 and 816 are engaged or coupled with the stent sections 712, 714, 812, 814. Such differences may affect the manner in which the stent sections 712, 714, 812, 814 are deployed and/or removed, as will be described in further detail below. Moreover, in contrast with prior art stents, because the stent-like plug 600 of the present disclosure utilizes two separate stents, expansion of the plug proximal section 612, 712, 812 and the plug distal section 614, 714, 814 may be separately effected if desired.

In the embodiment illustrated in FIGS. 14-17, the plug intermediate section 716 is coupled to the inner-facing ends of the proximal stent section 712 and distal stent section 714 of the stent-like plug 700. More particularly, in the illustrated embodiment, the proximal end 716p of the plug intermediate section 716 is coupled to the distal end 712d of proximal stent section 712, and the distal end 716d of the plug intermediate section 716 is coupled to the proximal end 714p of the distal stent section 714. The distal end 712d of the plug proximal section 712 and the proximal end 714p of distal stent section 714 may be referenced, collectively, as the inner-facing sides of the stent sections of the plug 700, such as when referencing the stent-like plug 700 as a unit. Likewise, the proximal end 712p of the plug proximal section 712 and the distal end 714d of the distal stent section 714 may be referenced, collectively, as the outer-facing or "extreme" ends of the stent-like plug 700 when referenced as a unit. In some embodiments, the stent configuration 900 used for the proximal stent section 712 and the distal stent section 714 is arranged such that the closed ends 901 are at the inner-facing sides of the stent sections of the plug 700 apposing the pylorus when positioned as illustrated in FIGS. 14 and 18. In such arrangement, the plug intermediate section 716 engages the stent mating section 912 from an exterior of the stent configuration 900 (the inner-facings sides of the stent sections 712 and 714).

In contrast, in the embodiment illustrated in FIG. 18, the plug intermediate section 816 is coupled to the outer-facing ends of the proximal stent section 812 and distal stent section 814 of the stent-like plug 800. More particularly, in the illustrated embodiment, the proximal end 816p of the plug intermediate section 816 is coupled to the proximal end 812p of proximal stent section 812, and the distal end 816d of the plug intermediate section 816 is coupled to the distal end 814d of the distal stent section 814. The proximal end 812p of the plug proximal section 812 and the distal end 814d of the distal stent section 814 may be referenced, collectively, as the outer-facing or "extreme" ends of the stent-like plug 800 when referenced as a unit. Likewise, the distal end 812d of the plug proximal section 812 and the proximal end 814p of distal stent section 814 may be referenced, collectively, as the inner-facing sides of the stent sections of the plug 800, such as when referencing the stent-like plug 800 as a unit. In some embodiments, the stent configuration 900 used for the proximal stent section 812 and the distal stent section 814 is arranged such that the closed ends 901 are at the outer-facing sides of the stent sections of the plug 800. As may be appreciated, the open end 903 of the stent configuration 900 is configured to present a smooth stent wall 910 apposing the pylorus when positioned as illustrated in FIG. 18. In such arrangement, the plug intermediate section 816 engages the stent mating section 912 from within the interior of the stent configuration 900 (the interiors of the stent sections 812 and 814).

A deployment device 640 and a delivery device 650 (e.g., a catheter or other form of delivery device known in the art or heretofore developed) may be used to deploy a stent-like plug 600 such as plug 700 or plug 800, as shown in an example illustrated in FIG. 15. It will be appreciated that although a plug 700 (e.g., of FIGS. 14 and 17) is shown in the example, the illustrated devices may be used to deploy a plug 800 (e.g., of FIG. 18) as well, with appropriate modifications for the stent section arrangements of the plug 800. In the undeployed state, as illustrated in FIG. 15 with a stent-like plug 700 as in FIGS. 14 and 17, the deployment device 640 engages a proximal end 716p of the plug intermediate section 716 and may be advanced to the deployment site to position the stent-like plug 700 in the desired location. The stent-like plug 700 may be carried with the deployment device 640 within the delivery device 650. In a configuration in which a stent configuration 900 as illustrated in FIGS. 20 and 21 is used, with the open end 903 at the proximal end 712p of the proximal stent section 712, the deployment device 640 passes through the opening 914 and distally through the proximal stent section 712 to engage the proximal end 716p of the plug intermediate section 716. In contrast, in an embodiment such as shown in FIG. 18, and in which a stent configuration as illustrated in FIGS. 20 and 21 is used, with the closed end 901 at the proximal end 812p of the proximal stent section 812, the deployment device 640 engages the proximal end 812p of the proximal stent section 812 without passing through the proximal stent section 812.

As illustrated in the detail section of FIG. 16, the deployment device 640 and the plug intermediate section 716 may have threaded mating sections, such as a distal mating section 644 on the deployment device 640 with external threads 645 engaging internal threads 735 in a proximal mating section 734 on the plug intermediate section 716. It will be appreciated that a reverse arrangement of engagement parts (e.g., the distal mating section 644 of the deployment device 640 having internal threads receiving external threads on the proximal mating section 734 of the plug intermediate section 716) is within the scope and spirit of the present disclosure.

Figure 19:
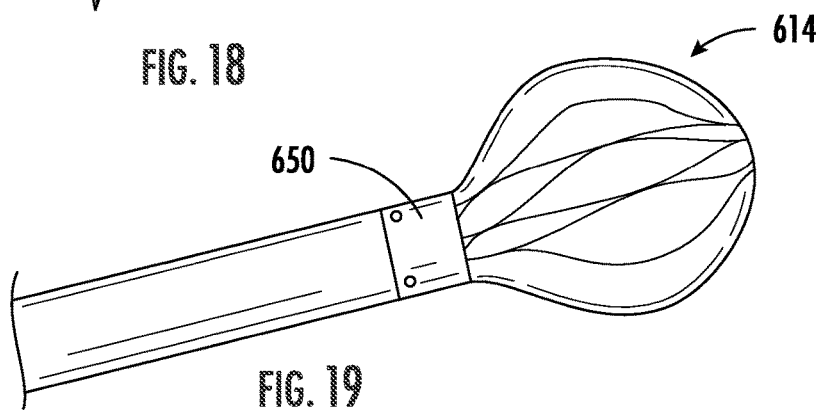
FIG. 19 illustrates an embodiment of a delivery system for delivering a lumen occlusion device or plug as in FIGS. 13-18.

The stent-like plugs 600, 700, 800 are delivered by the deployment device 640 and, optionally, within a delivery device 650 to the deployment site. When deployed across a pylorus, the distal stent section 614, 714, 814 is positioned on the distal side of the pylorus within the duodenum. Withdrawal of the delivery device 650 in a proximal direction permits expansion of the stent sections 612, 614, 712, 714, 812, 814, if configured to be self-expanding, such as illustrated conceptually in FIG. 19. As may be appreciated, as the delivery device 650 is proximally withdrawn, the stent sections 612, 614, 712, 714, 812, 814 are uncovered (generally sequentially—distal stent section 614, 714, 814, then proximal stent section 612, 712, 812) and no longer restrained so that they may expand into the deployed configuration at the deployment site. A distal stent section 614 is shown in FIG. 19 as an example for illustrative purposes. The distal stent sections 714, 814 may be exposed similarly to expand, and further proximal withdrawal of the deployment device 640 may allow the proximal stent sections 612, 712, and 812 to similarly expand.

In some embodiments, the stent sections of a stent-like plug 600, 700, 800 may be formed such that manipulation of a component thereof, such as the plug intermediate section 600, 716, 816, causes one or both of the stent sections 612, 614, 712, 714, 812, 814 to return to an unexpanded configuration for removal from the deployment site (such as by being retrieved into a device such as or similar to the delivery device 650 used to deploy the plug 600, 700, 800). In some embodiments, to remove the stent-like plug 600, the plug intermediate section 616 can be disrupted, such as unscrewing or otherwise detaching (if a suture or the like) from each stent section 612, 614, and each stent section 612, 614 can be captured and removed. Generally, if a stent configuration 900 as illustrated in FIGS. 20 and 21 is used, the stent may be constructed such that outward pulling on outer-facing ends of the stent (pulling of the stent ends in opposite directions), causes the stent to collapse. Accordingly, as noted above, the orientations of the stent sections 712, 714, 812, 814, in conjunction with the manner in which the plug intermediate sections 716 and 816 are engaged or coupled therewith, may affect the manner in which the stent-like plugs 700, 800 are returned to unexpanded configurations for removal, as will now be described.

To return a stent-like plug 700 as illustrated in FIGS. 14 and 17 to an unexpanded configuration which may be proximally advanced past the pylorus (or other structure normally impeding proximal movement of the distal stent section 714), a deployment device 640 may be engaged with the proximal end 716p of the plug intermediate section 716, such as in a reverse sequence as when deploying the plug 700 and removing and withdrawing the deployment device 640. If a valve is positioned in the open end 903 of the stent configuration 900, a hollow column 922 may be provided to guide passage of the deployment device 640 through the proximal stent section 712 to engage with the proximal end 716p of the plug intermediate section 716. In an embodiment in which the plug intermediate section engages the inner-facing sides of the stent sections of the plug, such as with an embodiment of stent-like plug 700 as illustrated in FIGS. 14 and 17 described above, proximal pulling on the plug intermediate section 716 causes shifting of the distal stent section 714 into an unexpanded configuration which may be proximally advanced past the pylorus (or other structure normally impeding proximal movement of the distal stent section 714). However, proximal pulling on the proximal end 716p of the plug intermediate section 716 would cause inward pulling on the closed end 901 at the proximal end 712p of the proximal stent section 712, which generally would not cause the proximal stent section 712 to collapse (and may even cause further expansion thereof). Thus, a retrieval structure 790, such as a loop or other element engageable during retrieval of the stent, such as by known or heretofore known procedures (e.g., engagement with a suture or grasper), may be provided on the proximal end 712p of the proximal stent section 712 to be pulled proximally to cause collapse of the proximal stent section 712 into an unexpanded configuration for removal from the deployment site. The retrieval structure 790 may be substantially centered along the open end 903 of the stent configuration 900 at the proximal end 712p of the proximal stent section 712. In some embodiments, the retrieval structure 790 may be an elastic member (e.g., an elastic suture) which cinches closed the open end 903 of the stent configuration 900. The respective pulling on the distal end 716d of the plug intermediate section 716 and on the retrieval structure 790 on the proximal stent section 712 may be timed so that the plug 700 collapses as desired for withdrawal proximally, such as into a delivery device 650 for removal from the deployment site.

To return a stent-like plug 800 as illustrated in FIG. 18 to an unexpanded configuration which may be proximally advanced past the pylorus (or other structure normally impeding proximal movement of the distal stent section 814), a deployment device 640 may be engaged with the proximal end 816p of the plug intermediate section 816, such as in a reverse sequence as when deploying the plug 800 and removing and withdrawing the deployment device 640. In an embodiment in which the plug intermediate section 816 engages the outer-facing sides of the stent sections of the plug, such as with an embodiment of stent-like plug 800 as illustrated in FIG. 18 described above, proximal pulling on the plug intermediate section 816 causes shifting of the proximal stent section 812 into an unexpanded configuration (by outward pulling on the closed end 901 of the stent configuration 900) for removal from the deployment site (such as within a delivery device 650). However, proximal pulling on the distal end 816d of the plug intermediate section 816 would cause inward pulling on the closed end 901 at the distal end 812d of the distal stent section 814, which generally would not cause the distal stent section 814 to collapse (and may even cause further expansion thereof). Thus, a retrieval structure 890, such as a loop or other element engageable during retrieval of the stent, such as by known or heretofore known procedures (e.g., engagement with a suture or grasper), may be provided on the proximal end 814p of the distal stent section 814 and extended along the plug 800 to be accessible at a proximal end thereof. The proximal end 891 of the retrieval structure 890 may be pulled proximally to cause collapse of the distal stent section 814 into an unexpanded configuration for removal from the deployment site. The retrieval structure 890 may be substantially centered along the open end 903 of the stent configuration 900 at the proximal end 814p of the distal stent section 814. In some embodiments, the retrieval structure 890 may be an elastic member (e.g., an elastic suture) which cinches closed the open end 903 of the stent configuration 900. The respective pulling on the proximal end 816p of the plug intermediate section 816 and on the retrieval structure 890 may be timed so that the plug 800 collapses as desired for withdrawal proximally, such as into a delivery device 650 for removal from the deployment site.

The above differences in deployment and removal of the stent-like plug 700, 800, may affect selection of which configuration to use for a given deployment site. In general, the configuration of the stent-like plug 700 of FIGS. 14 and 17 may be suitable for a pylorus without a large distance between the gastric site and the duodenal site. The configuration of the stent-like plug 800 of FIG. 18 may be suitable for large areas or vessel walls. The configuration of the stent-like plug 800 of FIG. 18 may also be suitable in regions with significant backflow as pulling of one stent section on the other stent section via the plug intermediate section 816 generally effects expanding of the stent sections 812, 814, thereby holding the stent sections 812, 814 in place as one section pulls on the other.

It will be appreciated that visualization markers such as radiopaque markers may be used in conjunction with any of the components or devices described herein such as to facilitate location, positioning, etc. during deployment and/or removal of an occlusion device or plug as disclosed herein. For instance, a retrieval structure such as a loop-shaped element may be provided with a radiopaque marker to facilitate location thereof for grasping or other engagement thereof. Any or each of the proximal, intermediate, and distal plug sections may include a radiopaque marker. At least a distal end of any devices used during deployment or removal/retrieval of the plug may include a radiopaque marker.

In some indications, a plug formed in accordance with the principle of the invention is intended for temporary use. Accordingly, in some embodiments, the occlusion device or plug may be formed of a bioabsorbable or biodegradable material such as known or heretofore known in the art. As such, after a predetermined period the stent degrades and is absorbed by or passes out of the body without the necessity for additional surgical intervention. The time period may depend on the properties of the biodegradable stent material and associated lifespan of the stent integrity. In comparison with SEMS (Self Expanding Metals Stents) or LAMS (Lumen Apposing Metals Stents), biodegradable stents (BDS's) formed in accordance with the present disclosure would have a biodegradable structure and coating/mesh and may provide temporary occlusion, such as a temporary bypass of the gastric outlet and duodenum. Examples of biomaterials which may be used include magnesium alloys and synthetic polymers; polylactic acid (PLA), poly-glycolic acid (PGA), poly-caprolactone (PCL), poly-dioxanone (PDX), and poly-lactide co-glycolide. Examples of uses of such a biodegradable plug include: in gastrointestinal endoscopy (as common to avoid ongoing dilation or surgery in patients with benign stenoses of the small and large intestines); in the esophagus and pancreatobiliary tract; or as a temporary pyloric closure stent.

The medical devices, instruments, tools, etc. (such terms may be used herein interchangeable without intent to limit) of the present disclosure are not limited, and may include a variety of medical devices, instruments, tools, etc., for accessing body passageways, and/or delivering and/or retrieving devices, etc., within the body. It will be appreciated that references to devices includes reference to shafts, catheters, sheaths, and other structures suitably configured.

All apparatuses and methods discussed herein are examples of apparatuses and/or methods implemented in accordance with one or more principles of this disclosure. These examples are not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure.

In the foregoing description and the following claims, the following will be appreciated. The phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

The foregoing discussion has been presented for purposes of illustration and description and is not intended to limit the disclosure to the form or forms disclosed herein. It will be understood that various additions, modifications, and substitutions may be made to embodiments disclosed herein without departing from the concept, spirit, and scope of the present disclosure. In particular, it will be clear to those skilled in the art that principles of the present disclosure may be embodied in other forms, structures, arrangements, proportions, and with other elements, materials, and components, without departing from the concept, spirit, or scope, or characteristics thereof. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. One skilled in the art will appreciate that the disclosure may be used with many modifications of structure, arrangement, proportions, materials, components, and otherwise, used in the practice of the disclosure, which are particularly adapted to specific environments and operative requirements without departing from the principles of the present disclosure. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the claimed invention being indicated by the appended claims, and not limited to the foregoing description.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. An occlusion device configured to shift between an expanded configuration sized to occlude a body passage or lumen and an unexpanded configuration sized for delivery to or removal from the body passage or lumen, said occlusion device comprising:
a proximal plug section;
a distal plug section;
an intermediate section extending between said proximal plug section and said distal plug section; and
a center core having a proximal end configured to mate with a distal end of a deployment device, and a distal end, said center core extending from said proximal end adjacent said proximal plug section, through said proximal plug section and through said distal plug section to the distal end adjacent said distal plug section in the unexpanded configuration of said occlusion device;
wherein:
said proximal plug section and said distal plug section present a smooth atraumatic outer surface for engagement with the body passage or lumen; and
said center core is longitudinally movable through said proximal plug section and said distal plug section to shift said occlusion device between the expanded and unexpanded configurations.

2. An occlusion device as in claim 1, wherein said center core causes relative movement between said proximal plug section and said distal plug section to shift said occlusion device between the expanded configuration and the unexpanded configuration.

3. An occlusion device as in claim 1, wherein:
said occlusion device is formed from a flexible polymeric tubular member forming said proximal plug section and said distal plug section; and
movement of said center core relative to said tubular member shifts said tubular member between expanded and unexpanded configurations.

4. An occlusion device as in claim 3, wherein:
said tubular member is formed from silicone;
a locking ring is mounted with respect to said center core for movement relative thereto; and
movement of said locking ring with respect to said center core causes a proximal end and a distal end of said tubular member to be moved together to cause said tubular member to expand outwardly at said proximal plug section and said distal plug section to form expanded proximal and distal plug sections of an expanded occlusion device.

5. An occlusion device as in claim 3, wherein said tubular member is formed with antimigration features on an outer surface thereof for atraumatic engagement with the body passage or lumen to hold said tubular member in a desired deployment position in the deployment site.

6. An occlusion device as in claim 1, further comprising:
a locking ring mounted on and held in a desired position on said center core adjacent said proximal plug section when said occlusion device is in an expanded configuration; and
an advancement mechanism arranged and positioned with respect to said center core and said locking ring to selectively engage said locking ring with said center core for relative movement therebetween and to selectively hold said locking ring in a desired position on said center core when said occlusion device is in a desired expanded configuration, and to release said locking ring from being held in position on said center core to allow said occlusion device to move towards an unexpanded configuration.

7. An occlusion device as in claim 6, wherein:
said advancement mechanism further comprises a pawl, on one of said center core and said locking ring, fitting in a groove, on the other of said center core and locking ring; and
said occlusion device further comprises a quick release mechanism coupled with said advancement mechanism to release said pawl to allow substantially immediate relative movement between said locking ring and said center core.

8. An occlusion device as in claim 6, wherein:
said locking ring is rotatably mounted on said center core to move along said center core towards a distal end of said center core and a distal end of said occlusion device to cause said occlusion device to expand, or towards a proximal end of said center core and a proximal end of said occlusion device to allow said occlusion device to return to an unexpanded configuration;
and
rotation of said center core via the deployment device causes rotation of said locking ring along said center core.

9. An occlusion device as in claim 1, wherein said proximal plug section and said distal plug section are expandable stents facing each other and coupled together by said intermediate section.

10. An occlusion device as in claim 9, wherein:
said proximal plug section and said distal plug section each have a closed end and an open end, wherein pulling the closed end of one of the plug sections away from the open end of the other of the plug sections causes the one of the plug sections to shift said occlusion device from an expanded configuration to an unexpanded configuration; and
said closed ends of said proximal plug section and said distal plug section are positioned with respect to each other, and said intermediate section is coupled with a closed end of at least one of said proximal plug section and said distal plug section such that proximal pulling on said intermediate section causes at least one of said proximal plug section and said distal plug section to shift from an expanded configuration to an unexpanded configuration.

11. An occlusion device as in claim 1, wherein:
said occlusion device is formed from a flexible silicone tubular member substantially impervious to passage of matter therethrough; and
said tubular member forms both said proximal plug section and said distal plug section to enclose a common interior.

12. An occlusion device as in claim 11, wherein said tubular member is preformed to expand into a predetermined expanded shape selected based on the deployment site.

13. An occlusion device as in claim 1, wherein said center core extends from a proximal end of said occlusion device to a distal end of said occlusion device.

14. An occlusion device as in claim 1, wherein:
said occlusion device is formed from a flexible polymeric tubular member forming said proximal plug section and said distal plug section;
said intermediate section comprises a center core extending through said proximal section and said distal section;

said center core is movable upon movement of the deployment device to cause at least one of said proximal plug section and said distal plug section to shift between an expanded configuration and an unexpanded configuration.

15. A system for occluding a body passage or lumen as in claim 14, further comprising:
    a locking ring; and
    a delivery device;
    wherein said delivery device has a distal end configured to abut a proximal side of said locking ring to control movement of said locking ring relative to said center core.

16. A system for occluding a body passage or lumen, said system comprising:
    an occlusion device comprising:
        a proximal plug section having a proximal end and a distal end, and shiftable between an unexpanded configuration and an expanded configuration;
        a distal plug section having a proximal end and a distal end, and shiftable between an unexpanded configuration and an expanded configuration; and
        an intermediate section extending from at least the distal end of said proximal plug section to at least the proximal end of said distal plug section with the proximal plug section and the distal plug section in unexpanded configurations; and
    a deployment device mating with said intermediate section of said occlusion device;
    wherein:
    said deployment device is engageable with said intermediate section to move said intermediate section to cause at least one of said proximal plug section or said distal plug section to shift from an unexpanded configuration to an expanded configuration;
    said proximal plug section and said distal plug section are expandable stents facing each other and coupled together by said intermediate section;
    said proximal plug section and said distal plug section each have a closed end and an open end, wherein pulling the plug sections away from each other causes the plug sections to shift from an expanded configuration to an unexpanded configuration;
    said intermediate section has a mating section at a proximal end thereof configured for engagement with a distal mating section of said deployment device; and
    proximal movement of said deployment device when engaged with said intermediate section pulls on a closed end of at least one of said proximal plug section and said distal plug section to shift said at least one of said proximal plug section and said distal plug section from an expanded configuration to an unexpanded configuration.

17. A system for occluding a body passage or lumen as in claim 16, wherein
    said mating section of said intermediate section and said mating section of said deployment device are threadedly mated.

18. A method of occluding a body passage or lumen, said method comprising:
    positioning, at a deployment site, an occlusion device in an unexpanded configuration, the occlusion device comprising a proximal plug section and a distal plug section with an intermediate section extending from at least a distal end of the proximal plug section to at least a proximal end of the distal plug section; and
    manipulating the intermediate section to cause at least one of the proximal plug section or the distal plug section to shift from an unexpanded configuration to an expanded configuration;
    wherein:
    the proximal plug section and the distal plug section are expandable stents facing each other and coupled together by the intermediate section;
    the proximal plug section and the distal plug section each have a closed end and an open end, wherein pulling the plug sections away from each other causes the plug sections to shift from an expanded configuration to an unexpanded configuration;
    the intermediate section is coupled with a closed end of at least one of the proximal plug section and the distal plug section; and
    said method further comprises pulling proximally on the intermediate section to cause the at least one of the proximal plug section and the distal plug section to shift from an expanded configuration to an unexpanded configuration.

19. A method of occluding a body passage or lumen as in claim 18, further comprising extending a deployment device through said proximal plug section to engage a proximal end of of said intermediate section.

20. A method of occluding a body passage or lumen as in claim 18, wherein
    pulling the closed end of one of the plug sections and the open end of the other of the plug sections away from each other causes the plug sections to shift from an expanded configuration to an unexpanded configuration.

* * * * *